United States Patent
Ryu et al.

(10) Patent No.: US 11,778,588 B2
(45) Date of Patent: *Oct. 3, 2023

(54) DISTRIBUTED SIDELINK RESOURCE ALLOCATION

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Chester, NJ (US); Tao Luo, San Diego, CA (US); Jelena Damnjanovic, Del Mar, CA (US); Kapil Gulati, Belle Mead, NJ (US); Juan Montojo, San Diego, CA (US); Ling Ding, Chester, NJ (US); Mahmoud Taherzadeh Boroujeni, San Diego, CA (US); Hong Cheng, Basking Ridge, NJ (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/095,627

(22) Filed: Nov. 11, 2020

(65) Prior Publication Data

US 2021/0160820 A1 May 27, 2021

Related U.S. Application Data

(60) Provisional application No. 62/940,736, filed on Nov. 26, 2019.

(51) Int. Cl.
*H04W 72/02* (2009.01)
*H04W 72/044* (2023.01)
(Continued)

(52) U.S. Cl.
CPC ........... *H04W 72/02* (2013.01); *H04W 24/08* (2013.01); *H04W 28/26* (2013.01);
(Continued)

(58) Field of Classification Search
CPC .............. H04W 72/02; H04W 72/046; H04W 72/0446; H04W 24/08; H04W 92/18;
(Continued)

(56) References Cited

U.S. PATENT DOCUMENTS

2018/0049143 A1* 2/2018 Gupta .................. H04W 16/14
2018/0234980 A1 8/2018 Li et al.
(Continued)

FOREIGN PATENT DOCUMENTS

WO WO 2019/200087 A1 * 10/2019 ............ H04W 16/28

OTHER PUBLICATIONS

Partial International Search Report—PCT/US2020/060106—ISA/EPO—dated Feb. 23, 2021.
(Continued)

*Primary Examiner* — Kan Yuen
(74) *Attorney, Agent, or Firm* — Holland & Hart LLP

(57) ABSTRACT

Methods, systems, and devices for wireless communications are described. Generally, the described techniques provide for determining shared resources associated with one or more user equipments (UEs) for sidelink communications, including control resources and data resources. A first UE may transmit a sidelink request to reserve a subset of data resources to a second UE, and may monitor for one or more sidelink responses indicating a positive sidelink response to the sidelink request, a negative sidelink response to the sidelink request, or both. The second UE may transmit a positive sidelink response if it is available for a data transmission. A third UE may transmit a negative sidelink response if it objects to the data transmission. The first UE may determine, based on monitoring for the one or more sidelink responses, whether to transmit a sidelink confirmation indicating a reservation of the subset of the data resources to the second UE.

11 Claims, 15 Drawing Sheets

(51) Int. Cl.
    *H04W 24/08*     (2009.01)
    *H04W 72/0446*     (2023.01)
    *H04W 28/26*     (2009.01)
    *H04W 92/18*     (2009.01)

(52) U.S. Cl.
    CPC ..... *H04W 72/046* (2013.01); *H04W 72/0446* (2013.01); *H04W 92/18* (2013.01)

(58) Field of Classification Search
    CPC .... H04W 76/23; H04W 28/26; H04B 7/0617; H04L 5/0037
    See application file for complete search history.

(56) References Cited

U.S. PATENT DOCUMENTS

| | | |
|---|---|---|
| 2019/0124694 A1 | 4/2019 | Chendamarai Kannan et al. |
| 2020/0336253 A1* | 10/2020 | He .................. H04L 5/0055 |
| 2020/0396717 A1* | 12/2020 | Luo .................. H04W 76/14 |
| 2021/0168814 A1* | 6/2021 | Chen ................ H04W 72/0493 |
| 2021/0195560 A1 | 6/2021 | Ryu et al. |
| 2021/0250931 A1* | 8/2021 | Yang ................ H04L 5/0053 |
| 2022/0104179 A1* | 3/2022 | Masini .............. H04W 4/40 |

OTHER PUBLICATIONS

International Search Report and Written Opinion—PCT/US2020/060106—ISA/EPO—dated May 14, 2021.

\* cited by examiner

DISTRIBUTED SIDELINK RESOURCE ALLOCATION

CROSS REFERENCE

The present Application for Patent claims the benefit of U.S. Provisional Patent Application No. 62/940,736 by RYU et al., entitled "DISTRIBUTED SIDELINK RESOURCE ALLOCATION," filed Nov. 26, 2019, assigned to the assignee hereof, and expressly incorporated by reference herein.

TECHNICAL FIELD

The following relates generally to wireless communications and more specifically to distributed sidelink resource allocation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some UEs may communicate directly with each other, for example, via one or more sidelink channels, and may utilize shared resources, for example, time resources, frequency resources, or spatial resources.

SUMMARY

The described techniques relate to improved methods, systems, devices, and apparatuses that support distributed sidelink resource allocation. Generally, the described techniques provide for determining shared resources associated with one or more user equipments (UEs) for communicating over one or more sidelink communication links. The shared resources may include control resources and data resources. A first UE may transmit a sidelink request to a second UE to reserve a subset of data resources. The first UE may monitor for one or more sidelink responses indicating a positive sidelink response to the sidelink request to reserve the subset of the data resources, a negative sidelink response to the sidelink request to reserve the subset of the data resources, or both. The second UE, which may be a target UE for the sidelink request, may transmit a positive sidelink response if it is available for a data transmission. A third UE, which may not be the target UE for the sidelink request, may transmit a negative sidelink response if it objects to the data transmission based on one or more conditions or parameters. The first UE may determine, based on monitoring for the one or more sidelink responses, whether to transmit a sidelink confirmation indicating a reservation of the subset of the data resources to one or more UEs, such as the second UE. For example, if the first UE receives a positive sidelink response from the second UE and no negative sidelink response from the third UE, then the first UE may transmit the sidelink confirmation to the second UE. If the UE receives no positive sidelink response from the second UE, or if the UE receives a negative sidelink response form the third UE, or both then the UE may refrain from transmitting the sidelink confirmation.

One innovative aspect of the subject matter described in this disclosure can be implemented in a method of wireless communications at a first UE. The method may include determining shared resources for communicating over one or more sidelink communication links, the shared resources including control resources and data resources, transmitting, to a second UE on a transmission beam over control resources in a first portion of a slot, a sidelink request to reserve a subset of the data resources, monitoring, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both, and determining, based on the monitoring, whether to transmit a sidelink confirmation indicating a reservation of the subset of the data resources to the second UE over control resources in a third portion of the slot.

Another innovative aspect of the subject matter described in this disclosure can be implemented by an apparatus for wireless communications at a first UE. The apparatus may include a processor, memory coupled with the processor, and instructions stored in the memory. The instructions may be executable by the processor to cause the apparatus to determine shared resources for communicating over one or more sidelink communication links, the shared resources including control resources and data resources, transmit, to a second UE on a transmission beam over control resources in a first portion of a slot, a sidelink request to reserve a subset of the data resources, monitor, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both, and determine, based on the monitoring, whether to transmit a sidelink confirmation indicating a reservation of the subset of the data resources to the second UE over control resources in a third portion of the slot.

Another innovative aspect of the subject matter described in this disclosure can be implemented by an apparatus for wireless communications at a first UE. The apparatus may include means for determining shared resources for communicating over one or more sidelink communication links, the shared resources including control resources and data resources, transmitting, to a second UE on a transmission beam over control resources in a first portion of a slot, a sidelink request to reserve a subset of the data resources, monitoring, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both, and determining, based on the monitoring, whether to transmit a sidelink confirmation indicating a reservation of the subset of the data resources to the second UE over control resources in a third portion of the slot.

Another innovative aspect of the subject matter described in this disclosure can be implemented by a non-transitory computer-readable medium storing code for wireless communications at a first UE. The code may include instructions executable by a processor to determine shared resources for communicating over one or more sidelink communication links, the shared resources including control resources and data resources, transmit, to a second UE on a transmission beam over control resources in a first portion of a slot, a sidelink request to reserve a subset of the data resources, monitor, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both, and determine, based on the monitoring, whether to transmit a sidelink confirmation indicating a reservation of the subset of the data resources to the second UE over control resources in a third portion of the slot.

Another innovative aspect of the subject matter described in this disclosure can be implemented in a method of wireless communications at a second UE. The method may include determining shared resources for communicating over one or more sidelink communication links, the shared resources including control resources and data resources, monitoring, on a receive beam over control resources in a first portion of a slot, for a sidelink request to reserve a subset of the data resources from a first UE, receiving, based on the monitoring, the sidelink request from the first UE, the sidelink request indicating that the second UE is a target UE of the sidelink request, and determining, based on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources.

Another innovative aspect of the subject matter described in this disclosure can be implemented by an apparatus for wireless communications at a second UE is described. The apparatus may include a processor, memory coupled with the processor, and instructions stored in the memory. The instructions may be executable by the processor to cause the apparatus to determine shared resources for communicating over one or more sidelink communication links, the shared resources including control resources and data resources, monitor, on a receive beam over control resources in a first portion of a slot, for a sidelink request to reserve a subset of the data resources from a first UE, receive, based on the monitoring, the sidelink request from the first UE, the sidelink request indicating that the second UE is a target UE of the sidelink request, and determine, based on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources.

Another innovative aspect of the subject matter described in this disclosure can be implemented by an apparatus for wireless communications at a second UE. The apparatus may include means for determining shared resources for communicating over one or more sidelink communication links, the shared resources including control resources and data resources, monitoring, on a receive beam over control resources in a first portion of a slot, for a sidelink request to reserve a subset of the data resources from a first UE, receiving, based on the monitoring, the sidelink request from the first UE, the sidelink request indicating that the second UE is a target UE of the sidelink request, and determining, based on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources.

Another innovative aspect of the subject matter described in this disclosure can be implemented by a non-transitory computer-readable medium storing code for wireless communications at a second UE. The code may include instructions executable by a processor to determine shared resources for communicating over one or more sidelink communication links, the shared resources including control resources and data resources, monitor, on a receive beam over control resources in a first portion of a slot, for a sidelink request to reserve a subset of the data resources from a first UE, receive, based on the monitoring, the sidelink request from the first UE, the sidelink request indicating that the second UE is a target UE of the sidelink request, and determine, based on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources.

Another innovative aspect of the subject matter described in this disclosure can be implemented in a method of wireless communications at a third UE. The method may include determining shared resources for communicating over one or more sidelink communication links, the shared resources including control resources and data resources, monitoring, on a receive beam over control resources in a first portion of a slot, for a sidelink request to reserve a subset of the data resources, receiving, based on the monitoring, the sidelink request from the first UE, the sidelink request indicating that a second UE is a target UE of the sidelink request, and determining, based on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources.

Another innovative aspect of the subject matter described in this disclosure can be implemented by an apparatus for wireless communications at a third UE. The apparatus may include a processor, memory coupled with the processor, and instructions stored in the memory. The instructions may be executable by the processor to cause the apparatus to determine shared resources for communicating over one or more sidelink communication links, the shared resources including control resources and data resources, monitor, on a receive beam over control resources in a first portion of a slot, for a sidelink request to reserve a subset of the data resources, receive, based on the monitoring, the sidelink request from the first UE, the sidelink request indicating that a second UE is a target UE of the sidelink request, and determine, based on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources.

Another innovative aspect of the subject matter described in this disclosure can be implemented by an apparatus for wireless communications at a third UE. The apparatus may include means for determining shared resources for communicating over one or more sidelink communication links, the shared resources including control resources and data resources, monitoring, on a receive beam over control resources in a first portion of a slot, for a sidelink request to reserve a subset of the data resources, receiving, based on the monitoring, the sidelink request from the first UE, the sidelink request indicating that a second UE is a target UE of the sidelink request, and determining, based on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources.

Another innovative aspect of the subject matter described in this disclosure can be implemented by a non-transitory computer-readable medium storing code for wireless communications at a third UE. The code may include instructions executable by a processor to determine shared resources for communicating over one or more sidelink communication links, the shared resources including control resources and data resources, monitor, on a receive beam over control resources in a first portion of a slot, for a sidelink request to reserve a subset of the data resources, receive, based on the monitoring, the sidelink request from the first UE, the sidelink request indicating that a second UE is a target UE of the sidelink request, and determine, based on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources.

DETAILED DESCRIPTION

Figure 1:
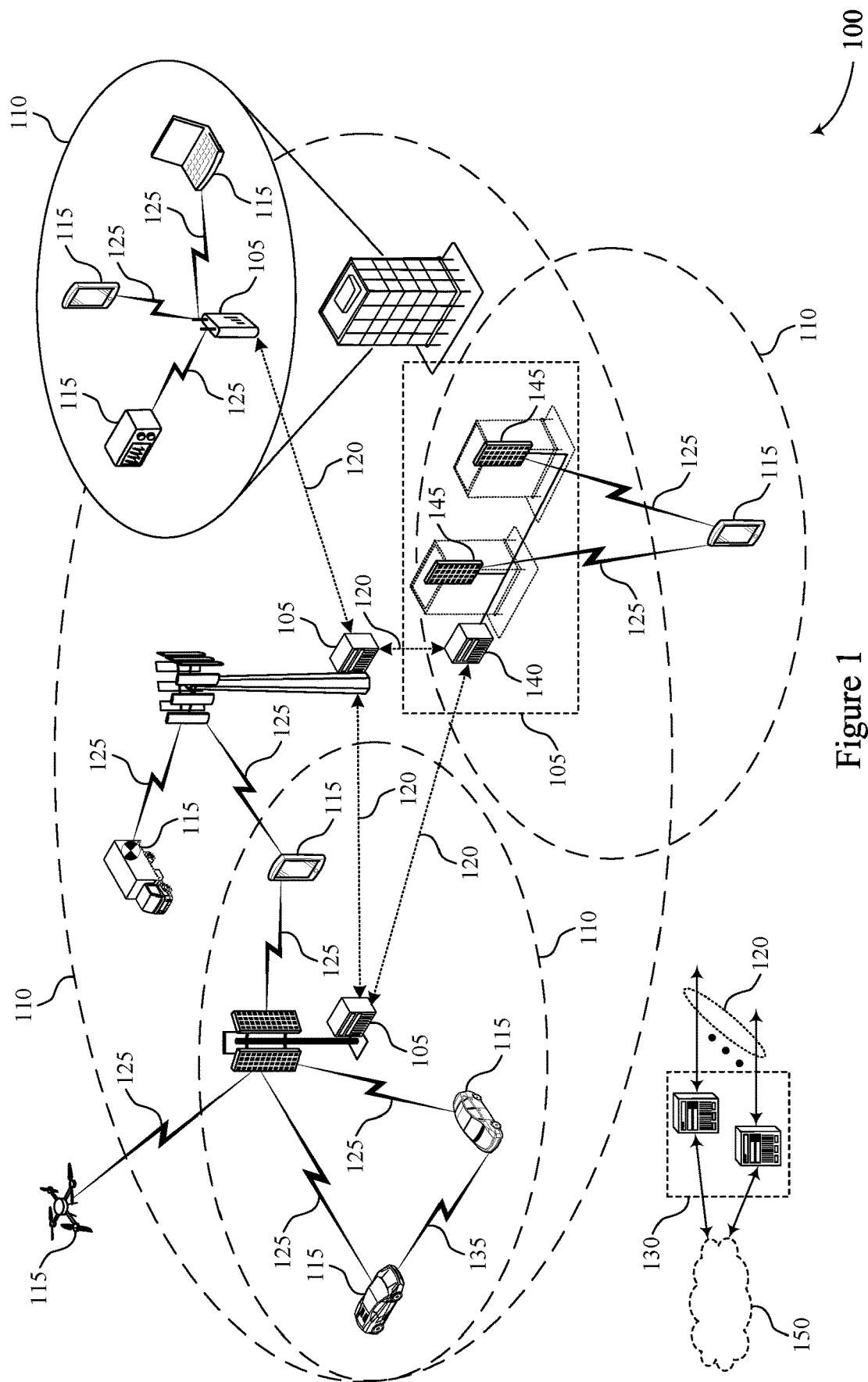
FIG. 1 illustrates an example of a wireless communications system that supports distributed sidelink resource allocation in accordance with aspects of the present disclosure.

In some examples of a wireless communications system, a base station may allocate shared resources for sidelink communications (such as, communications between user equipments (UEs)). The UEs may perform beam training procedures to identify one or more characteristics or parameters (such as directional beams) on which to communicate with each other, and the UEs may communicate with each other on sidelink communication links using resources, for example data resources, from a pool of shared resources.

Some methods of determining which UE of a set of sidelink UEs will have access to shared resources may result in system inefficiency. In some examples, a base station may indicate to one or more served UEs which shared resources to use for each sidelink transmission. Such sidelink communication allocation, however, may result in an unnecessary increase in signaling overhead and a decrease in system efficiency. In some examples, the UEs may autonomously contend for shared resources. But in such examples, resources may be under-utilized (resulting in an inefficient use of the shared resources), or over-utilized (resulting in increased interference, failed transmissions, and decreased quality of user experience). That is, if the UEs are configured to be overly cautious about avoiding collisions, or are not configured to make appropriate use of spatial resources (for example, beamforming techniques), then otherwise-available resources may remain unused. Additionally, or alternatively, if too many UEs are concurrently transmitting on the same shared resources (for example, on beams that interfere with each other), then link quality may degrade, which may result in one or more of failed transmissions, multiple retransmissions, increased system latency, or other problems.

Various aspects generally relate to distributed resource allocation for sidelink communications, and more specifically, to reservation-based techniques by which UEs may utilize shared resources for sidelink communications. In some aspects, a first UE may transmit a sidelink request via a sidelink to a second UE to reserve a subset of data resources of a shared resource pool for sidelink communications to the second UE or another UE. The first UE may then monitor for sidelink responses from the second UE and any other UEs in the vicinity. Each sidelink response may, in some examples, be either a positive sidelink response or a negative sidelink response. In such examples, the second UE may transmit a positive sidelink response if it is available for a data transmission. Based on receiving a positive sidelink response from the second UE, and assuming that the first UE doesn't receive any negative sidelink responses, it may then transmit a sidelink confirmation to the second UE indicating a reservation of the subset of data resources. The first UE may then proceed with transmitting a sidelink communication to the second UE on the subset of data resources. However, in other examples, a third UE in the vicinity may transmit a negative sidelink response if it objects to the sidelink communications on the subset of data resources. In such examples, the first UE may determine, based on receiving the at least one negative sidelink response, to not transmit a sidelink confirmation and subsequently a sidelink communication in the subset of data resources.

In various examples, a shared resource pool may generally include control resources and data resources. Control resources may be divided into control blocks (for example, control blocks each having a duration of 1 slot). A control block may have a duration of one or more transmission time intervals (for example, one or more slots). In some aspects, in a first portion of the slot, the control resources may be allocated for transmission of a sidelink request by a UE. In a second portion of the slot, resources may be allocated for transmission of one or more sidelink response messages by other UEs. In a third portion of the slot, resources may be allocated for a sidelink confirmation from the UE that transmitted the sidelink request. The sidelink confirmation may indicate a reservation of the data resources requested in the sidelink request. One or more UEs may use the above described signaling (e.g., sidelink requests, sidelink responses, and sidelink confirmations) to claim shared resources from a shared resource pool. In some examples, the one or more UEs may dynamically claim shared resources according to a schedule.

Particular aspects of the subject matter described herein may be implemented to realize one or more advantages. The described techniques may support increased efficiency, increased power savings, and improved user experience, among other benefits. One or more UEs utilizing the described techniques may efficiently make use of shared resources without under-utilizing shared resources (which could result in an inefficient use of the shared resources), or over-utilizing shared resources (which could result in increased interference, failed transmissions, and decreased quality of user experience). That is, use of the described techniques may result in both interference reduction and efficient use of available resources resulting in reduced system latency. In some examples, described techniques may allow one or more UEs to save power (for example, instead of expending power in an unnecessary monitoring procedure for a data transmission that has been aborted).

Aspects of the disclosure are initially described in the context of wireless communications systems and resource allocation schemes. Aspects of the disclosure are further illustrated by and described with reference to apparatus diagrams, system diagrams, and flowcharts that relate to distributed sidelink resource allocation.

FIG. 1 illustrates an example of a wireless communications system 100 that supports distributed sidelink resource allocation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated with respect to FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown with respect to FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. The "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown with respect to FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier. In some examples, the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported. In some examples, a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, a base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback In some examples, the device may provide HARQ feedback in a specific slot for data received in a previous symbol in the slot. In other cases, the device may provide HARQ feedback in a subsequent slot, or according to some other time interval.

Some methods of determining which UE of a set of sidelink UEs will have access to shared resources may result in system inefficiency. In some examples, a base station may indicate to one or more served UEs which shared resources to use for each sidelink transmission. Such sidelink communication allocation, however, may result in an unnecessary increase in signaling overhead and a decrease in system efficiency. In some examples, the UEs may autonomously contend for shared resources. But in such examples, resources may be under-utilized (resulting in an inefficient use of the shared resources), or over-utilized (resulting in increased interference, failed transmissions, and decreased quality of user experience).

One or more UEs 115 may efficiently determine shared resource use by communicating with each other. UEs 115 may determine shared resources for communicating over one or more sidelink communication links. The shared resources may include control resources, and data resources. A first UE 115 may transmit a sidelink request to reserve a subset of data resources to a second UE. The first UE 115 may monitor for one or more sidelink responses indicating a positive sidelink response to the sidelink request to reserve the subset of the data resources, a negative sidelink response to the sidelink request to reserve the subset of the data resources, or both. The second UE 115, which may be the target UE 115 for the sidelink request, may transmit a positive sidelink response if it is available for a data transmission. A third UE 115, which may not be the target UE 115 for the sidelink request, may transmit a negative sidelink response if it objects to the data transmission. The first UE 115 may determine, based on monitoring for the one or more sidelink responses, whether to transmit a sidelink confirmation indicating a reservation of the subset of the data resources to the second UE 115. For example, if the first UE 115 receives a positive sidelink response from the second UE 115 and no negative sidelink response from the third UE 115, then the first UE may transmit the sidelink confirmation. If the UE 115 receives no positive sidelink response from the second UE 115, or if the UE 115 receives a negative sidelink response form the third UE 115, then the UE 115 may refrain from transmitting the sidelink confirmation.

Figure 2:
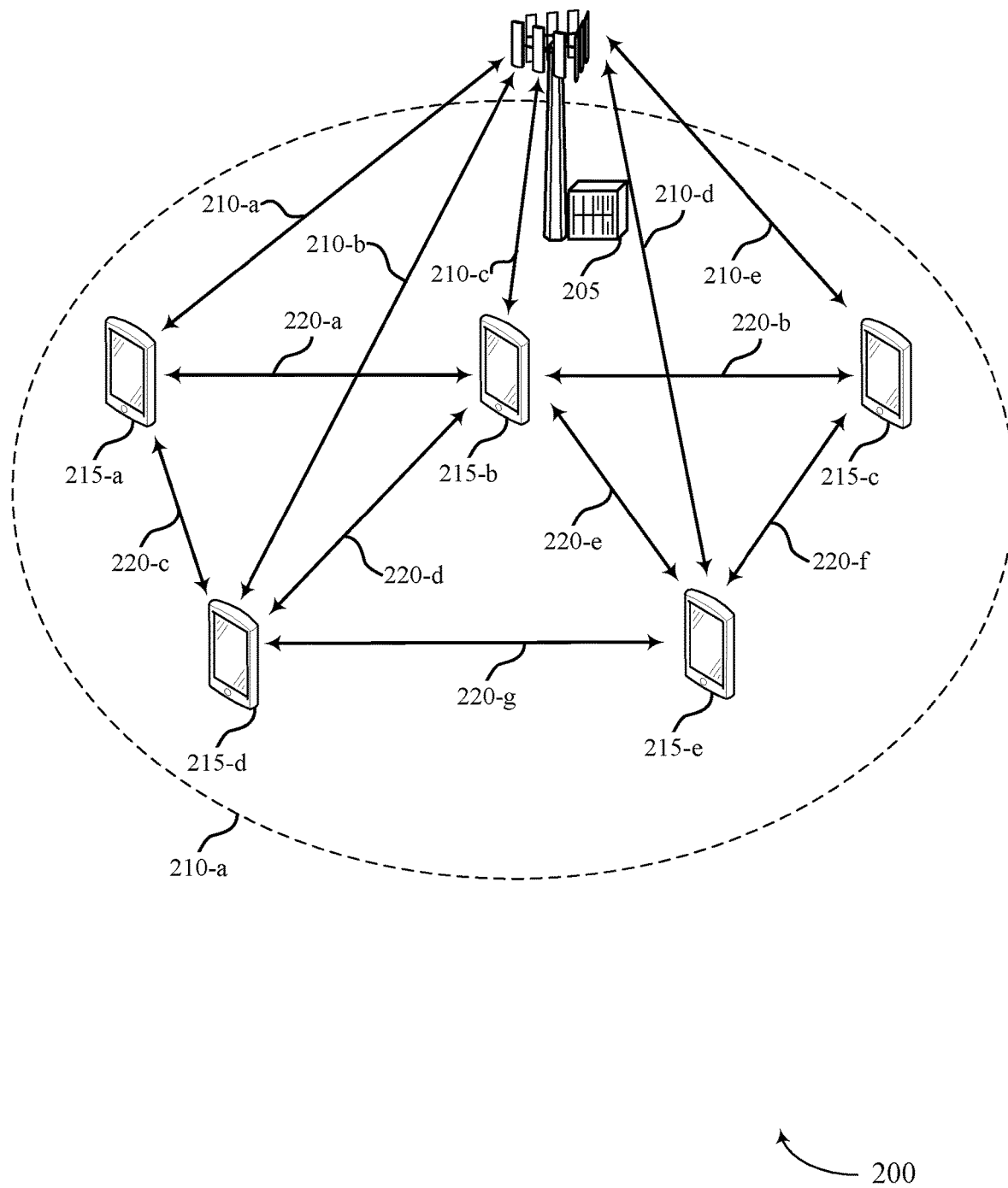
FIG. 2 illustrates an example of a wireless communications system that supports distributed sidelink resource allocation in accordance with aspects of the present disclosure.

FIG. 2 illustrates an example of a wireless communications system 200 that supports distributed sidelink resource allocation in accordance with aspects of the present disclosure. In some examples, wireless communications system 200 may implement aspects of wireless communications system 100.

A base station 205 may serve one or more UEs 215 located within a geographic area 210-a. For example, the base station 205 may serve the UE 215-a, the UE 215-b, the UE 215-c, the UE 215-d, or the UE 215-e. The UEs 215 may communicate with each other via one or more sidelink connections 220 (for example, the sidelink connection 220-a, the sidelink connection 220-b, the sidelink connection 220-c, the sidelink connection 220-d, the sidelink connection 220-e, the sidelink connection 220-f, or the sidelink connection 220-g). The base station 205 may communicate with the UEs 215 via one or more bidirectional communication links 210 (for example, the bidirectional communication link 210-a, the bidirectional communication link 210-b, the bidirectional communication link 210-c, the bidirectional communication link 210-d, or the bidirectional communication link 210-e).

In some examples, the base station 205 may allocate sidelink resources (for example, shared resources for sidelink communications between the UEs 215) to the UEs 215 via one or more of the bidirectional communication links 210. The shared resources may include data resources and control resources in some examples. The UEs 215 may communicate with each other (for example, via sideband connections 220) to claim at least some of the shared data resources. The UEs 215 may split the shared data resources (for example, dynamically or as indicated by one or more other devices such as the base station 205) into sub-pools. In some examples, each sub-pool may be shared, may be different in size, or both, among other differences or similarities. In some examples, a UE 215 may claim a sub-pool of the shared data resources. The base station 205 may restrict the UEs 215 from claiming the entirety of a pool of shared resources, and may permit the UEs 215 to claim one or more sub-pools (for example, an overall subset) of the shared resources.

Other techniques for determining which of the UEs 215 will have access to shared data resources may result in system inefficiency. In some examples, the base station 205 may communicate with the UEs 215 via the bidirectional communication links 210 and may allocate one or more of the shared resources to one or more respective UEs 215 for each sidelink communication. Such sidelink communication allocation, however, may result in an unnecessary increase in signaling overhead and a decrease in system efficiency. In some examples, the UEs 215 may autonomously contend for shared data resources. In such examples, resources may be under-utilized (resulting in inefficient use of the shared data resources), or over-utilized (resulting in increased interference and failed transmissions, and decreased user experience). That is, if the UEs are configured to be overly cautious about avoiding collisions, or are not configured to make appropriate use of spatial resources (for example, beamforming techniques), then otherwise-available resources may remain unused. Additionally, or alternatively, if too many UEs are concurrently transmitting on the same shared resources (for example, on the beams that interfere with each other), then link quality may degrade, which may result in one or more of failed transmissions, multiple retransmissions, increased system latency, or other problems. Thus, to increase system efficiency and decrease interference, among other advantages, the UEs may dynamically claim shared resources, for example according to a schedule, and may communicate with each other to identify and decrease interference while making efficient use of available shared resources.

The UEs 215 may determine a priority schedule, which may determine an order in which the UEs 215 may take turns attempting to claim data resources. The UEs 215 may communicate with each other, autonomously (for example, without formal scheduling by the base station 205), using control resources according to the priority schedule. In some examples, the base station 205 may transmit, to the UEs 215, an indication of the priority schedule. In some examples, the UEs 215 may dynamically determine the priority schedule (for example, without receiving an indication of the priority schedule from the base station).

The control resources may include resources allocated for signal types. For example, the UEs 215 may determine (for example, via preconfigured information or signaling from the base station 205), resources for sidelink request messages, positive sidelink response and negative sidelink response messages, and sidelink confirmation messages, as described with reference to greater detail with respect to FIG. 3. The control resources may include multiple portions of resources, which may be referred to as control blocks. Each control block in the control resources may include resources for one or more of a sidelink request message, a positive sidelink response message, a negative sidelink response message, or a sidelink confirmation. A UE 215 that is scheduled, according to the priority schedule, for a particular control block may transmit a sidelink request message to a target UE 215 over the control block. The sidelink request message may indicate that the UE 215 intends to transmit a data message over a portion of the shared resources.

If a UE 215 was scheduled to receive a data transmission over a portion of the data resources over a previous control block, then that the UE 215 may have priority and may be able to object to the transmission over the control block. For instance, over a first control block, the UE 215-a may communicate with UE 215-b, and may determine to send a data transmission using a portion of the data resources. The UE 215-b may receive the data transmission from the UE 215-a using a first receive beam. Over a second control block, the UE 215-d may be scheduled according to the priority schedule, and may transmit a sidelink request message to the UE 215-e. The UE 215-e may receive the sidelink request message using a second receive beam. If the UE 215-e is available for the transmission, then the UE 215-e may transmit a positive sidelink response message. However, the UE 215-b may be monitoring, using the first receive beam, over the second control block, and may receive the sidelink request message on the first receive beam. The UE 215-b may determine that a data transmission from the UE 215-d to the UE 215-e may interfere with the previously scheduled data transmission on the first receive beam. In such examples, because the UE 215-a is a higher priority UE 215 than the UE 215-d (for example, because UE 215-a scheduled UE 215-b for a data transmission over a previous control block), the UE 215-b may transmit a negative sidelink response message. The UE 215-d may receive the negative sidelink response message, and may determine to abort or refrain from transmitting the data transmission to the UE 215-e. Control signaling over various control blocks is described in greater detail with respect to FIGS. 3-8. Various signaling scenarios between the UEs 215 is described in greater detail with respect to FIGS. 4-8.

Figure 3:
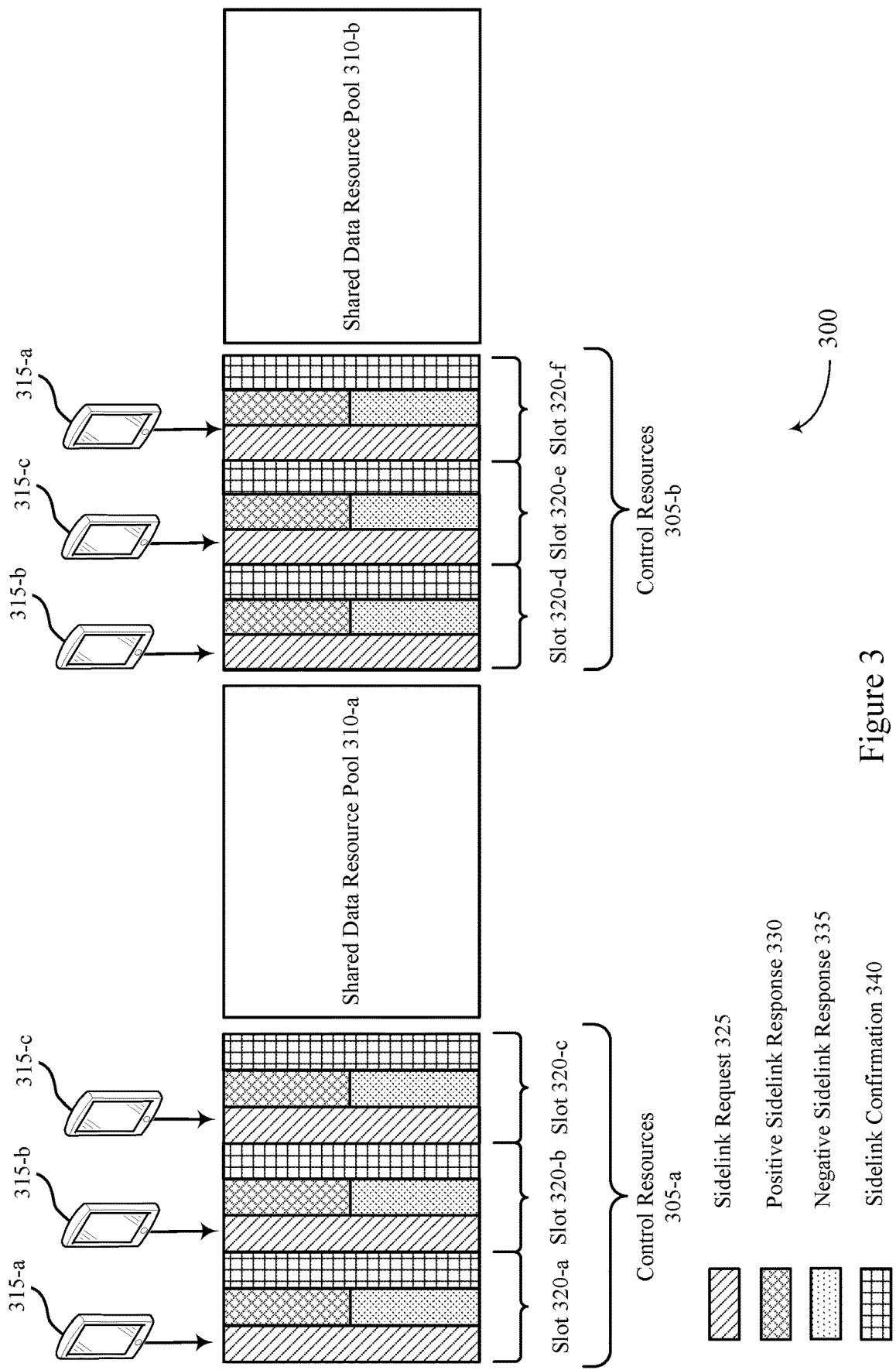
FIG. 3 illustrates an example of a resource allocation scheme that supports distributed sidelink resource allocation in accordance with aspects of the present disclosure.

FIG. 3 illustrates an example of a resource allocation scheme 300 that supports distributed sidelink resource allocation in accordance with aspects of the present disclosure. In some examples, resource allocation scheme 300 may implement aspects of wireless communications systems 100 and 200.

In some examples, multiple UEs 315 may communicate with each other (for example, via one or more sidelink connections). A base station 105 may allocate shared resources to one or more of the UEs 315. The shared resources may include control resources 305 and shared data resource pools 310. The UEs 315 may determine which UE 315 will transmit and receive in the shared data resource pools 310 without additional signaling from a base station 105, and may increase the number of transmissions in the shared data resource pools 310 while decreasing interference, among other advantages. The UEs 315 may perform beam training procedures to determine which transmit and receive beams to use for communicating with each other. The UEs 315 may utilize these beams while transmitting control signals, as described with reference to greater detail with respect to FIGS. 4-8.

The UEs 315 may communicate with each other on the control resources 305 to claim data resources from the shared data resource pools 310. The control resources may include one or more control blocks. Each control block may have a duration (for example, 1 slot). Each control block may include resources allocated for communicating different types of signals. For example, each control block may include resources allocated for one or more of a sidelink request 325, a positive sidelink response 330, a negative sidelink response 335, or a sidelink confirmation 340. A UE 315 may transmit a sidelink request 325 to a target UE 315 to claim data resources for data transmissions. A sidelink request 325 may include a UE identifier for the target UE 315. The other UEs 315 may monitor for the sidelink request 325 (for example, to determine whether the other UEs 315 are the target UE 315 or to determine if a data transmission from the sidelink request transmitting UE 315 will cause interference above a threshold to a previously scheduled data transmission).

A target UE 315 may transmit a positive sidelink response 330 in response to a sidelink request 325 to accept a data transmission. A target UE 315 may transmit a positive sidelink response if it determines that it is not already scheduled to receive a data transmission or if a higher priority transmission will not cause interference above a threshold, among other examples. A non-target UE 315 may transmit a negative sidelink response 335 in response to a sidelink request 325 to object to a data transmission between the UE 315 that transmitted the sidelink request 325 and the target UE 315. The non-target UE 315 may transmit a negative sidelink response 335, for example, if a data transmission from the UE 315 that transmitted the sidelink request 325 will interfere with a previously scheduled data transmission for the non-target UE. A positive sidelink response 330 and a negative sidelink response 335 may occupy a same time (for example, may overlap time resources over a portion of a slot 320) and may occupy different frequency tones.

A UE 315 that transmitted a sidelink request 325 may transmit a sidelink confirmation 340 to confirm a scheduled data transmission or may refrain from transmitting a sidelink confirmation 340 to indicate that a data transmission has been aborted or refrained from being performed. In some examples, if the UE 315 receives a positive sidelink response 330 from the target UE 315 and no negative sidelink responses 335, then it may transmit the sidelink confirmation 340. In some examples, if the UE 315 does not receive a positive sidelink response 330 from the target UE 315, or if the UE 315 receives one or more negative sidelink responses 335 from one or more other UEs 315, (or if both occur), then the UE 315 may refrain from transmitting the sidelink confirmation message.

The UEs 315 may take turns, according to the priority schedule, attempting to claim data resources form a shared data resource pool 310 over corresponding control resources 305. At least some, if not all, of the UEs 315 may be aware of the priority schedule, and may thus monitor, transmit, or receive, or any combination thereof over the resources allocated for the control signals over respective control blocks.

In some examples, a base station 105 may transmit a downlink indication of the priority schedule. For example, the priority schedule may indicate that UE 315-*a* is assigned a control block over a slot 320-*a* of control resources 305-*a*, that UE 315-*b* is assigned a control block over a slot 320-*b* of control resources 305-*a*, and that UE 315-*c* is assigned a control block over a slot 320-*c* of control resources 305-*a*. One or more of the UEs 315 may only attempt to claim data resources from the shared data resource pool 310-*a* over their respective assigned control blocks. That is, over the slot 320-*a*, the UE 315-*a* may transmit a sidelink request 325, but UE 3125-*b* and UE 315-*c* may refrain from or may be prohibited from transmitting sidelink requests over the slot 320-*a*. Similarly, the UE 315-*b* may transmit a sidelink request 325 over the slot 320-*b* and UE 315-*c* may transmit a sidelink request 325 over the slot 320-*c*. The same downlink indication of the priority schedule, or a new indication of a priority schedule, may indicate assignments for control resources 305-*a*, or may include a pattern or set of rules for subsequent control resources (for example, a rotation schedule, a round robin rule, among other examples).

For instance, the downlink indication may indicate that UE 315-*b* is assigned a control block over a slot 320-*d* of control resources 305-*b*, that UE 315-*c* is assigned a control block over a slot 320-*e* of control resources 305-*b*, and that UE 315-*a* is assigned a control block over a slot 320-*f* of control resources 305-*b*. In some examples, the UEs 315 may communicate according to the priority schedule across multiple control resources 305 until the base station 105 transmits a new indication (for example, including a new or updated priority schedule). In some examples, the base station may transmit a new indication of a priority schedule prior to each set of control resources 305-*b*.

In some examples, the UEs 315 may determine the priority schedule without input from the base station 105. For instance, the UEs 315 may determine a rotating priority schedule. For example, the UE 315-*a* is assigned the first slot (for example, the slot 320-*a*) of a first set of control resources 305-*a*, the third slot (for example, slot 320-*f*) of a second set of control resources 305-*b*, the second slot of a subsequent set of control resources 305-*c* (not shown), and so on across multiple sets of control resources 305-*a*.

A UE 315 that is assigned a control block that is earlier than another control block may have a higher priority than a UE 315 that is assigned to a later control block. That is, the UE 315-*a* may have a higher priority than the UE 315-*b*, and if the UE 315-*a* is scheduled for a transmission over the slot 320-*a*, then the UE 315-*a* or a UE 315 scheduled to communicate with the UE 315-*a* may object to a transmission scheduled by the UE 315-*b* over the slot 320-*b*.

The UEs 315 may attempt to claim data resources from the shared data resource pools 310 according to the priority schedule. For example, the UE 315-*a* may transmit, according to the priority schedule, a sidelink request 325 over a first portion of the slot 320-*a*. The UE 315-*a* may transmit the sidelink request 325 to a target UE 315 (for example, the UE 315-*c*). In some examples, the UE 315-*b* and the UE 315-*c* may direct respective receive beams toward the UE 315-*a* based on the priority schedule, among other factors. The UE 315-*c* may receive the sidelink request over the first portion of the slot 320-*a* and may transmit a positive sidelink response 330 over the second portion of the slot 320-*a*. The UE 315-*b* may also receive the sidelink request over the first portion of the slot 320-*a*. If the UE 315-*b* determines that it does not have a conflicting data transmission schedule, among other conditions, then UE 315-*b* may refrain from transmitting a negative sidelink response 335 over the second portion of the slot 320-*a*. Over the third portion of the slot 320-*a*, having received the positive sidelink response 330 from the UE 315-*c*, and having received no negative sidelink response messages 335 from any of the other UEs 315 (such as the UE 315-*b*), the UE 315-*a* may transmit a sidelink confirmation 340 to UE 315-*c*. The UE 315-*c* may thus be scheduled to receive a data transmission on a set or portion of data resources from the shared data resource pool 310-*a* on the same receive beam on which it received the sidelink request 325 and the sidelink confirmation 340.

Over the slot 320-*b*, the UE 315-*b* may attempt to schedule a data transmission with a fourth UE 315 (not shown). The UE 315-*b* may transmit a sidelink request 325 to the fourth UE 315 over the first portion of the slot 320-*b*. Over the second portion of the slot 320-*b*, the fourth UE may transmit a positive sidelink response 330 to the UE 315-*b*. The UE 315-*c* may monitor, over the second portion of the slot 320-*b*, for the sidelink request 325 from the UE 315-*b* using the same receive beam on which UE 315-*a* scheduled the data transmission over the slot 320-*a*. If the UE 315-*c* receives the sidelink request 325 from the UE 315-*b* over the slot 320-*b* on that beam, then the UE 315-*c* may measure interference, among other aspects, of the potential data transmission from the UE 315-*b* to the fourth UE on that receive beam. If the interference is above a threshold (for example, will create a relatively low signal to interference plus noise ratio (SINR) on that receive beam), then the UE 315-*c* may object to the scheduling of a data transmission between UE 315-*b* and the target UE 315 of the slot 320-*b*. That is, the UE 315-*c* may transmit a negative sidelink response 335 over the slot 320-*b* because UE 315-*c* was scheduled by the UE 315-*a*, which has a higher priority than the UE 315-*b*. Upon receiving the negative sidelink response 335 over the second portion of the slot 320-*b*, the UE 315-*b* may abort the data transmission, and may refrain from transmitting a sidelink confirmation 340 over the third portion of the slot 320-*b*.

The other UE 315 that received the sidelink request 325 over the slot 320-*b* may determine that no data transmission is scheduled based on not receiving the sidelink confirmation 340 over the third portion of the slot 320-*b*. Any of the UEs 315 that have successfully scheduled a data transmission (for example, the UE 315-*a*) may perform the data transmission using claimed data resources from the shared data resource pool 310-*a*. Over control resources 305-*b*, the UEs 315 may claim data resource from the shared data resource pool 310-*b* according to the priority schedule.

A UE 315 may determine, based on one or more beam training procedures, which one or more beams to use to communicate with other UEs 315. For instance, over a control block, if a UE 315 is not scheduled to receive any data transmissions, then it may monitor for a sidelink request 325 by training its receive beam on the UE 315 that is scheduled to transmit a sidelink request 325, for example, according to the priority schedule. That is, the UE 315-*b* and the UE 315-*c* may both direct their receive beams to receive a sidelink request 325 from the UE 315-*a*, for example, according to a previously performed beam training procedure. The UE 315-*b* and the UE 315-*c* may thus determine, by receiving the sidelink request 325 over the slot 320-*a*, whether each is the target UE 315.

If a UE 315 is already scheduled to receive a data transmission on a receive beam, then it may monitor for sidelink requests 325 using that receive beam. For example, if the UE 315-*a* schedules UE 315-*c* over the slot 320-*a* for a data transmission on a first receive beam, then the UE 315-*c* may monitor for subsequent sidelink requests 325 over control resources 305-*a* on the first receive beam. By monitoring for sidelink requests 325 using the first receive beam, the UE 315-*c* may determine whether potential subsequently schedulable data transmissions will interfere with the previously scheduled data transmission using the first receive beam. The UE 315-*c* may determine whether to transmit a negative sidelink response 335 based on monitoring for sidelink request 325 on the first receive beam, among other actions.

Figure 4:
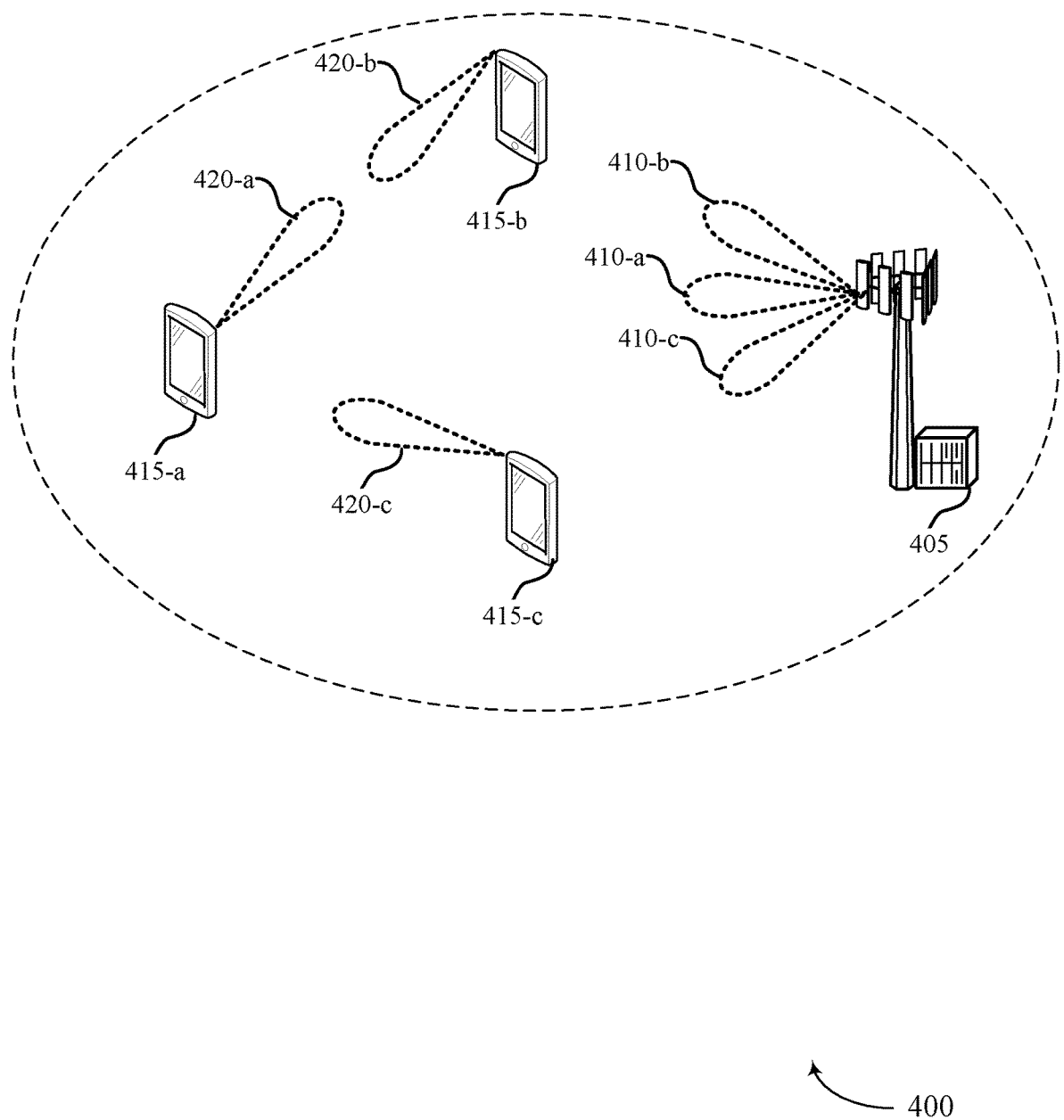
FIG. 4 illustrates an example of a wireless communications system that supports distributed sidelink resource allocation in accordance with aspects of the present disclosure.

FIG. 4 illustrates an example of a wireless communications system 400 that supports distributed sidelink resource allocation in accordance with aspects of the present disclosure. In some examples, wireless communications system 400 may implement aspects of wireless communications systems 100 and 200.

In some examples, a base station 105-*a* may communicate with one or more of the UEs 415. The base station 405 may transmit downlink signals on one or more beams 410. For example, the base station 405 may communicate with the UE 415-*a* on the beam 410-*a*, may communicate with the UE 415-*b* on the beam 410-*b*, and may communicate with the UE 415-*c* on the beam 410-*c*. In some examples, the base station 405 may allocate shared resources for sidelink communication among one or more of the UEs 415. The shared resources may include control resources, including multiple control blocks, and data resources, as described with reference to greater detail with respect to FIG. 3. The UEs 415 may identify a priority schedule that indicates which UE 415 may attempt to claim the data resources over each control block of the control resources. The base station 405 may transmit the priority schedule to the UEs 415, or alternatively the UEs 415 may determine the priority scheduled autonomously or based on a preconfigured priority schedule, among other examples, as described with reference to greater detail with respect to FIG. 3. The UEs 415 may perform one or more beam training procedures, to identify which beams 420 to use for communicating with each other. For instance, the UE 415-*b* may determine which beam 420 to use to communicate with each of the UE 415-*a* and the UE 415-*c*. To communicate with the UE 415-*a*, the UE 415-*b* may use the beam 420-*b* to receive sidelink transmissions from the UE 415-*a* or transmit sidelink communications to the UE 415-*a*.

In some examples, the UEs 415 may use their beams 420 based on a priority schedule. For example, the UEs 415 may determine, according to a priority schedule, that the UE 415-*a* is scheduled to attempt to claim the data resources over a control block (for example, over a slot in the control resources). Based on the priority schedule, the UE 415-*b* may use the beam 420-*b* to receive from the UE 415-*a*, to determine whether it is the target UE 415 of the UE 415-*a*. The UE 415-*c* may be available for data transmissions using the data resources (for example, may not have been scheduled previously by another UE 415). Thus, the UE 415-*c* may also use the beam 420-*c* to receive from the UE 415-*a*, to determine whether it is the target UE 415 of the UE 415-*a*.

The UE 415-*a* may attempt to schedule a sidelink data transmission to the UE 415-*b*. The UE 415-*a* may use the beam 420-*a* to communicate with the UE 415-*b* (for example, based on the beam training procedure). Over the first portion of the slot, the UE 415-*a* may transmit to the UE 415-*b*, on the beam 420-*a*, a sidelink request to reserve a subset of the data resources. In some examples, the sidelink request may include an identifier, for example a UE 415 identifier, indicating which UE 415, such as the UE 415-*b*, is the target UE 415. The UE 415-*b* may receive the sidelink request on the beam 420-*b* and may determine that it is the target UE 415. If the UE 415-*b* does not have a conflicting transmission scheduled by another UE 415 (for example, as described with reference to greater detail with respect to FIG. 6), among other alternative operations or conditions, and if the UE 415-*b* does not sense interference from another UE 415 on the beam 420-*b* (for example, as described with reference to greater detail with respect to FIG. 7) above a threshold, then the UE 415-*b* may transmit, on the beam 420-*b*, a positive sidelink response (for example, indicating a positive response to the sidelink request). The UE 415-*c* may also monitor for the sidelink request on the beam 420-*c* over the first portion of the slot.

In some examples, (for example, based on the direction of beam 420-*a*), the UE 415-*c* may not receive the sidelink request. In such examples, over the second portion of the slot, the UE 415-*c* may refrain from transmitting a sidelink response (for example, a negative sidelink response). In some examples, the UE 415-*c* may receive the sidelink request over the first portion of the slot. In such examples, the UE 415-c may determine that it is not the target UE 415 (for example, based on the UE 415 identifier included in the sidelink request). The UE 415-c may determine that it does not object to a data transmission from the UE 415-a on the beam 420-a (for example, because the UE 415-c is not already scheduled to receive a data transmission over the subset of data resources or because a data transmission on the beam 420-a will not cause interference above a threshold for the UE 415-c). Upon determining that it does not object to a data transmission over the subset of data resources on the beam 420-a, the UE 415-c may refrain from transmitting a negative sidelink response to the UE 415-a on the beam 420-c over the second portion of the slot.

The UE 415-a may determine whether to send a data transmission based on monitoring for sidelink responses from other UEs 415. For example, the UE 415-a may monitor for sidelink responses from the other UEs 415 over the second portion of the slot on the beam 420-a. As described with respect to FIG. 4, the UE 415-a may receive the positive sidelink response from the UE 415-b, and may not receive a negative sidelink response from the UE 415-c.

Based on these responses, the UE 415-a may determine that the UE 415-b is available for a data transmission over the subset of the data resources, and that no other UEs 415 (for example, the UE 415-c) object to the data transmission on the beam 420-a. In such examples, the UE 415-a may transmit a sidelink confirmation of the reservation of the subset of the data resources over a third portion of the slot on the beam 420-a to the UE 415-b. The UE 415-b may receive the sidelink confirmation and may determine that the data transmission indicated in the sidelink request is confirmed. After the control resources that correspond to a set of data resources are over, the UE 415-a may transmit the data transmission to the UE 415-b using the reserved subset of the data resources. The UE 415-b may monitor for the data transmission using beam 420-b and may successfully receive the data transmission. The UE 415-c may also monitor for the sidelink confirmation on the beam 420-c. If the UE 415-c receives the sidelink confirmation, it may determine that the subset of the data resources is successfully reserved, and may account for this information over one or more subsequent control blocks (for example, as described with reference to greater detail with respect to FIG. 7).

Figure 5:
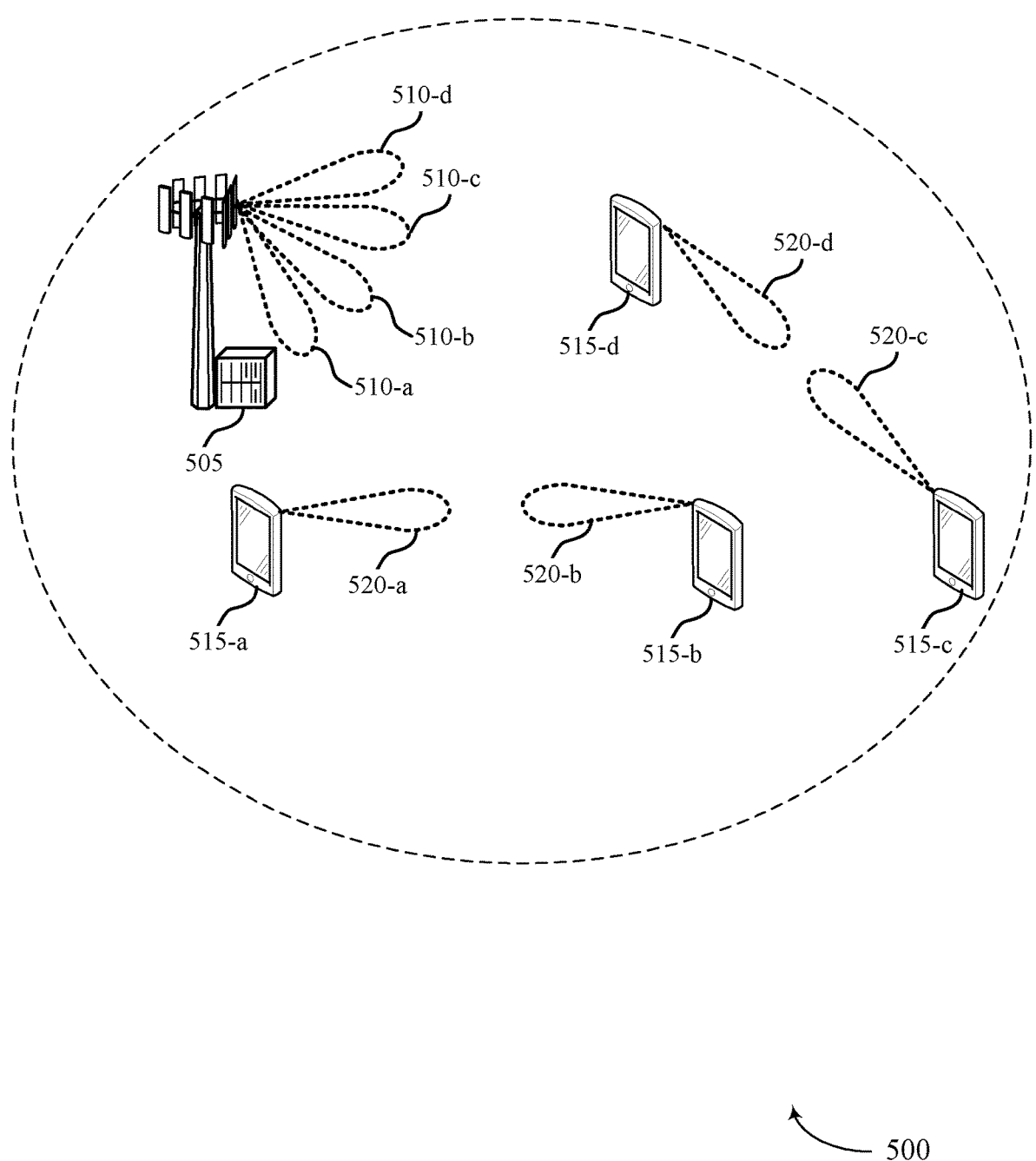
FIG. 5 illustrates an example of a wireless communications system that supports distributed sidelink resource allocation in accordance with aspects of the present disclosure.

FIG. 5 illustrates an example of a wireless communications system 500 that supports distributed sidelink resource allocation in accordance with aspects of the present disclosure. In some examples, wireless communications system 500 may implement aspects of wireless communications systems 100, 200, and 400.

In some examples, a base station 505 may communicate with one or more of the UEs 515. The base station 505 may transmit downlink signals on one or more beams 510. For example, the base station 505 may communicate with the UE 515-a on the beam 510-a, may communicate with the UE 515-b on the beam 510-b, may communicate with the UE 515-c on the beam 510-c, and may communicate with the UE 515-d on the beam 510-d. In some examples, the base station 505 may allocate shared resources for sidelink communication among the UEs 515. The shared resources may include control resources, including multiple control blocks, and data resources, as described with reference to greater detail with respect to FIG. 3. The UEs 515 may identify a priority schedule that indicates which UE 515 may attempt to claim the data resources over each control block of the control resources. The base station 505 may transmit the priority schedule to the UEs 515, or the UEs 515 may determine the priority scheduled autonomously or based on a preconfigured priority schedule, among other examples, as described with reference to greater detail with respect to FIG. 3. The UEs 515 may perform one or more beam training procedures, to identify which beams 520 to use for communicating with each other. For instance, the UE 515-b may determine which beam 520 to use to communicate with each of the UE 515-a, the UE 515-c, and the UE 515-d. To communicate with the UE 515-a, the UE 515-b may use the beam 520-b to receive sidelink transmissions from the UE 515-a or transmit sidelink communications to the UE 515-a.

In some examples, the UEs 515 may use their beams 520 based on a priority schedule, or previously scheduled transmissions, or both. For instance, the UEs 515 may determine, according to a priority schedule, that the UE 515-a is scheduled to attempt to claim the data resources over a control block (for example, over a slot in the control resources). Based on the priority schedule, the UE 515-b may use the beam 520-b on the UE 515-a, to determine whether it is the target UE 515 of the UE 515-a. The UE 515-c may be scheduled to receive another data transmission from the UE 515-d on the beam 520-c. That is, over a previous slot, the UE 515-d may have transmitted a sidelink request on the beam 520-d, the UE 515-c may have received the sidelink request and may have transmitted a positive sidelink response to the UE 515-d on the beam 520-c and the UE 515-d may have transmitted a sidelink confirmation to the UE 515-c on the beam 520-d. Thus, over the current slot, the UE 515-c may maintain beam 520-c directed towards the UE 515-d and may monitor for a sidelink request (for example, from the UE 515-a) on the beam 520-c.

The UE 515-b may receive, over a first portion of the slot, the sidelink request to reserve a subset of the data resources from the UE 515-a and may determine that it is available for a data transmission over the subset of data resources. In such examples, over a second portion of the slot, the UE 515-b may transmit a positive sidelink response to the UE 515-a on the beam 520-b. Then, the UE 515-b may continue to monitor, over a third portion of the slot on the beam 520-b, for a sidelink confirmation indicating a reservation of the subset of the data resources.

The UE 515-c may determine whether a potential transmission from the UE 515-a on the beam 520-a to the UE 515-b will cause interference above a threshold on the beam 520-c. That is, the UE 515-c may monitor for the sidelink request from the UE 515-a using beam 520-c, and may perform one or more measurements to determine a level of interference on the beam 520-c. If the UE 515-a successfully reserves the subset of the data resources for a data transmission to the UE 515-b using beam 520-a, then the UE 515-a will transmit the scheduled data transmission to the UE 515-b using the same beam 520-a. Thus, if the sidelink request on the beam 520-a is received at the UE 515-c on the beam 520-c with a signal power that is above a threshold, then a potential data transmission from the UE 515-a to the UE 515-b on the beam 520-a may also cause interference above a threshold for the UE 515-c on the beam 520-c while the UE 515-c is receiving from the UE 515-d. However, the UE 515-d may have previously scheduled a data transmission on the data resources (for example, overlapping partially or completely with the data transmission from the UE 515-a to the UE 515-b). Because the previously scheduled data transmission may have a higher priority (for example, according to the priority scheduled), the UE 515-c may object to the data transmission from the UE 515-a to the UE 515-b if it will interfere with the previously scheduled data transmission from the UE 515-d.

In some examples, the UE 515-c may determine a level of interference or signal power (for example, relative to a threshold) for the sidelink request. In some examples, the UE 515-c may compare a measured interference level with a threshold interference value, or the UE 515-c may compare a measure signal power level with a threshold signal power value. If the measured interference level is below the threshold, then the UE 515-c may determine that a data transmission from the UE 515-a on the beam 520-a will not interfere with the previously scheduled data transmission from the UE 515-d (for example, the interference level will not degrade the previously scheduled data transmission to a sufficient degree causing an adjustment). In such examples, the UE 515-c may refrain from transmitting a negative sidelink response to the UE 515-a.

If the measured interference level is above the threshold, then the UE 515-c may determine that a data transmission from the UE 515-a on the beam 520-a will interfere with the previously scheduled data transmission from the UE 515-d to a sufficient degree causing an adjustment (for example, the interference level will degrade the previously scheduled data transmission). That is, the beam 520-c and the beam 520-b may be the same, or sufficiently similar with respect to spatial direction or angular distance, among other examples, such that a data transmission received by the UE 515-b on the beam 520-b will interfere with a data transmission on the same data resources received by the UE 515-c on the beam 520-c. In such examples, the UE 515-c may transmit a negative sidelink response to the UE 515-a. In some examples, the UE 515-c may transmit the negative sidelink response to the UE 515-a on the beam 520-c.

If the UE 515-c determines that interference on the beam 520-c from the UE 515-a is sufficiently high to transmit a negative sidelink response to the UE 515-a, then beam 520-c and beam 520-a may be sufficiently aligned with respect to space that the UE 515-a may successfully receive the negative sidelink response transmitted by the UE 515-c on the beam 520-c. Alternatively, as described with reference to greater detail with respect to FIG. 8, the UE 515-c may transmit the negative sidelink response to the UE 515-a on a different beam 520 that is directed towards the UE 515-a to further increase the likelihood that the UE 515-a receives the negative sidelink response.

The UE 515-a may determine whether to transmit the data transmission to the UE 515-b based on monitoring for sidelink responses from other UEs 515. Over the second portion of the slot, the UE 515-a may monitor for the sidelink responses from the other UEs 515. The UE 515-a may receive, on the beam 520-a from the UE 515-b, a positive sidelink response indicating that the UE 515-b is available and able to receive the data transmission on the beam 520-b. If the UE 515-c determines that the data transmission will not interfere with the previously scheduled data transmission from the UE 515-d on the beam 520-c above a threshold, the UE 515-c may refrain from transmitting a negative sidelink response. In such examples, the UE 515-a may transmit, on the beam 520-a, a sidelink confirmation indicating reservation of the subset of data resources. Subsequently, the UE 515-a may transmit, to the UE 515-b on the beam 520-a, the data transmission over the subset of the data resources. Similarly, and in some examples concurrently, the UE 515-d may transmit the previously scheduled data transmission to the UE 515-c on the beam 520-d over a partially or completely overlapping subset of the data resources. Because the UE 515-c determined that such overlapping data transmissions would not cause interference above a threshold, the UE 515-b and the UE 515-c may successfully receive the overlapping data transmissions, resulting in efficient use of available data resources and increased system efficiency.

If the UE 515-c determines that the data transmission will interfere with the previously scheduled data transmission from the UE 515-d on the beam 520-c, then the UE 515-c may transmit a negative sidelink response (for example, on the beam 520-c). Because of the spatial alignment between beam 520-c and beam 520-a, the UE 515-a may receive the negative sidelink response over the second portion of the slot. The UE 515-a may determine that, although it received a positive sidelink response from the UE 515-a, the UE 515-c has objected to the data transmission over the subset of the data resources on the beam 520-a. In such examples, the UE 515-a may refrain from transmitting a sidelink confirmation over the third portion of the slot on the beam 520-a.

The UE 515-b may monitor for the sidelink confirmation over the third portion of the slot on the beam 520-a. The UE 515-b may determine, based on not receiving the sidelink confirmation, that the UE 515-a will not transmit the data transmission. In such examples, the UE 515-b may save power by refraining from monitoring for the data transmission over the subset of the control resources. That is, without the sidelink confirmation, the UE 515-b would not know that the data transmission indicated in the sidelink request is no longer pending. In such examples, the UE 515-b may expect the data transmission and monitor for it over the subset of the control resources, resulting in unnecessarily expended power. Thus, transmitting a sidelink confirmation, or refraining from transmitting the sidelink confirmation, may result in increased power savings, among other advantages, for UEs 515 compared to different alternative methods.

Figure 6:
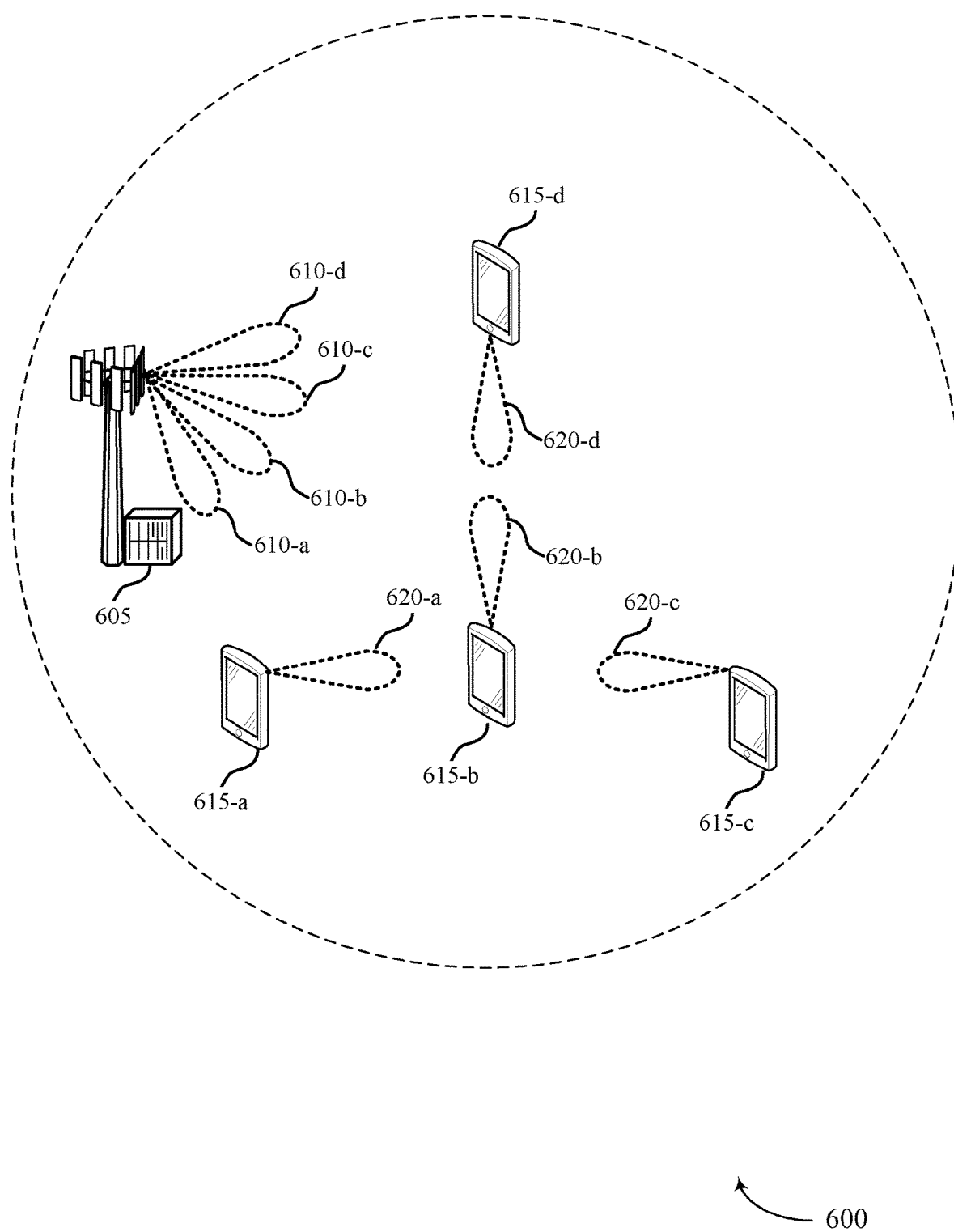
FIG. 6 illustrates an example of a wireless communications system that supports distributed sidelink resource allocation in accordance with aspects of the present disclosure.

FIG. 6 illustrates an example of a wireless communications system 600 that supports distributed sidelink resource allocation in accordance with aspects of the present disclosure. In some examples, wireless communications system 600 may implement aspects of wireless communications system 100, 200, and 400-500.

In some examples, a base station 605 may communicate with one or more of the UEs 615. The base station 605 may transmit downlink signals on one or more beams 610. For example, the base station 605 may communicate with the UE 615-a on the beam 610-a, may communicate with the UE 615-b on the beam 610-b, may communicate with the UE 615-c on the beam 610-c, and may communicate with the UE 615-d on the beam 610-d. In some examples, the base station 605 may allocate shared resources for sidelink communication among the UEs 615. The shared resources may include control resources, including multiple control blocks, and data resources, as described with reference to greater detail with respect to FIG. 3. The UEs 615 may identify a priority schedule that indicates which UE 615 may attempt to claim the data resources over each control block of the control resources. The base station 605 may transmit the priority schedule to the UEs 615, or the UEs 615 may determine the priority scheduled autonomously or based on a preconfigured priority schedule, among other examples, as described with reference to greater detail with respect to FIG. 3. The UEs 615 may perform one or more beam training procedures, to identify which beams 620 to use for communicating with each other. For instance, the UE 615-c may determine which beam 620 to use to communicate with each of the UE 615-a, the UE 615-b, and the UE 615-d. To communicate with the UE 615-a, the UE 615-c may use the beam 620-c to receive sidelink transmissions from the UE 615-a or transmit sidelink communications to the UE 615-a.

In some examples, the UEs 615 may use their beams 620 based on a priority schedule, or previously scheduled transmissions, or both. For instance, the UEs 615 may determine, according to a priority schedule, that the UE 615-*a* is scheduled to attempt to claim the data resources over a control block (for example, over a slot in the control resources). Based on the priority schedule, the UE 615-*c* may use the beam 620-*c* on the UE 615-*a*, to determine whether it is the target UE 615 of the UE 615-*a*. The UE 615-*b* may be scheduled to receive another data transmission from the UE 615-*d* on the beam 620-*b*. That is, over a previous slot, the UE 615-*d* may have transmitted a sidelink request on the beam 620-*d*, the UE 615-*b* may have received the sidelink request and may have transmitted a positive sidelink response to the UE 615-*d* on the beam 620-*b*, and the UE 615-*d* may have transmitted a sidelink confirmation to the UE 615-*b* on the beam 620-*d*. Thus, over the current slot, the UE 615-*b* may maintain beam 620-*b* directed toward the UE 615-*d*, and may monitor for a sidelink request (for example, from the UE 615-*a*) on the beam 620-*b*.

The UEs 615 (for example, the UE 615-*b* and the UE 615-*c*) may monitor for a sidelink request (for example, from the UE 615-*a*) over the first portion of the slot. The UE 615-*a* may transmit the sidelink request on the beam 620-*a*. The UE 615-*c* may monitor for the sidelink request on the beam 620-*c* to determine whether it is the target UE 615 for the UE 615-*a*. The UE 615-*c* may receive the sidelink request, and determine that it is not the target UE 615. Having no objection to a data transmission from the UE 615-*a* on the beam 620-*a* to the UE 615-*b*, the UE 615-*c* may refrain from transmitting a negative sidelink request over the second portion of the slot. The UE 615-*b* may monitor for the sidelink request over the first portion of the slot on the beam 620-*b* (for example, the beam on which it is scheduled to receive a data transmission from the UE 615-*d*). Beam 620-*b* and beam 620-*a* may be spatially unaligned, and UE 615-*b* may not receive the sidelink request. In such examples, the UE 615-*b* may not transmit a positive sidelink response because it is not triggered to send a sidelink response by a sidelink request. In some examples, the UE 615-*b* may receive the sidelink request on the beam 620-*b*. The sidelink request may indicate that the UE 615-*b* is the target UE 615 for the UE 615-*a*. The UE 615-*b*, however, may already be scheduled to receive a data transmission from the UE 615-*d*. Thus, the UE 615-*b* may refrain from transmitting a positive sidelink response.

The UE 615-*a* may determine whether to transmit the data transmission to the UE 615-*b* based on monitoring for sidelink responses from other UEs 615. For example, the UE 615-*a* may not receive a positive sidelink response from the UE 615-*b*. Having failed to receive a sidelink response from the UE 615-*b* over the second portion of the slot, the UE 615-*a* may refrain from transmitting a sidelink confirmation over the third portion of the slot. Refraining from transmitting the sidelink confirmation over the third portion of the slot may indicate (for example, to the UE 615-*b*, the UE 615-*c*, and any other UEs 615 monitoring for a sidelink confirmation over the third slot), that the UE 615-*a* has aborted or refrained from transmitting the data transmission on the beam 620-*a*. Other UEs 615 may take this information into account if scheduling data transmissions over subsequent control blocks.

Figure 7:
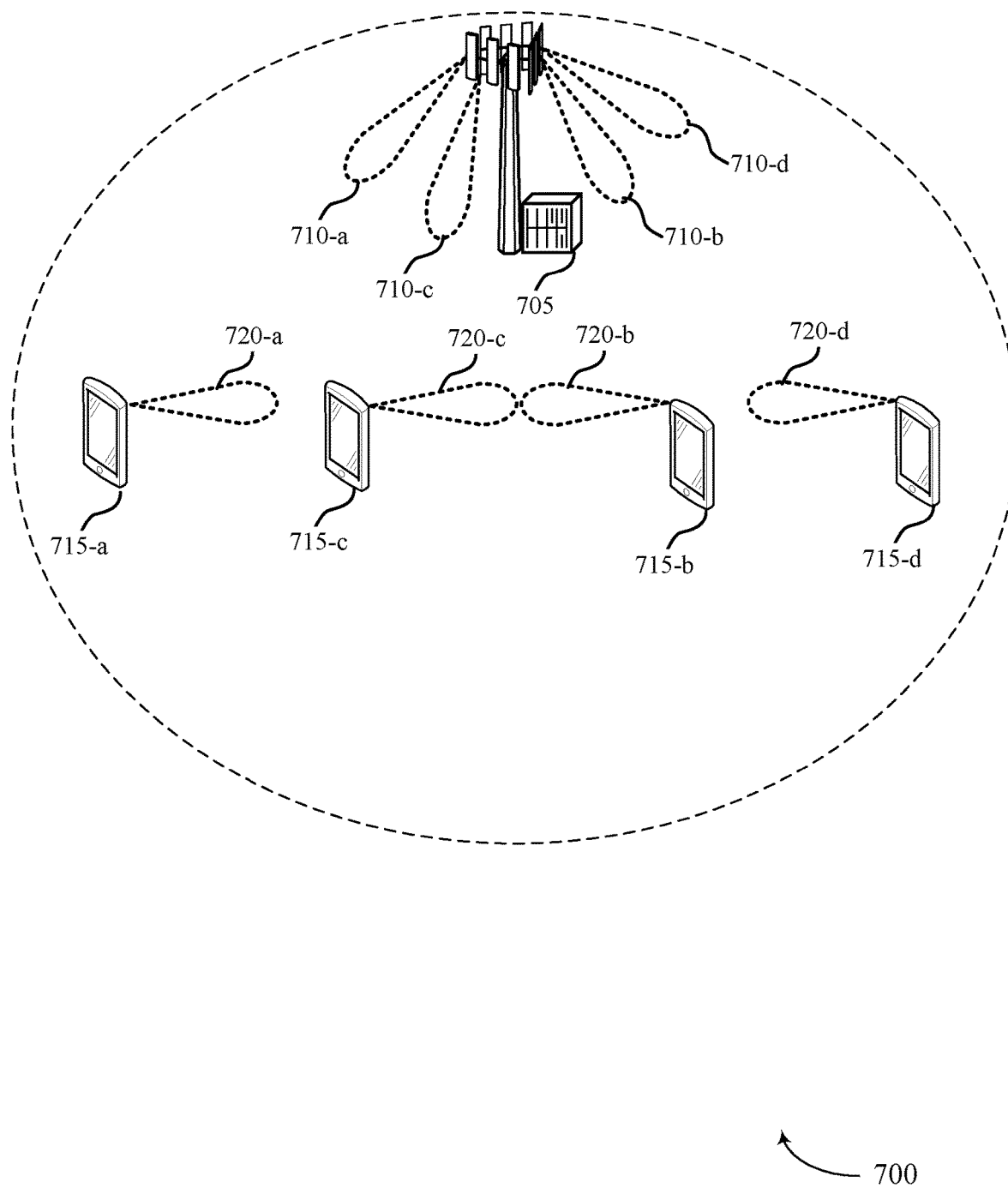
FIG. 7 illustrates an example of a wireless communications system that supports distributed sidelink resource allocation in accordance with aspects of the present disclosure.

FIG. 7 illustrates an example of a wireless communications system 700 that supports distributed sidelink resource allocation in accordance with aspects of the present disclosure. In some examples, wireless communications system 700 may implement aspects of wireless communications systems 100, 200, and 400-600.

In some examples, a base station 705 may communicate with one or more of the UEs 715. The base station 705 may transmit downlink signals on one or more beams 710. For example, the base station 705 may communicate with the UE 715-*a* on the beam 710-*a*, may communicate with the UE 715-*b* on the beam 710-*b*, may communicate with the UE 715-*c* on the beam 710-*c*, and may communicate with the UE 715-*d* on the beam 710-*d*. In some examples, the base station 705 may allocate shared resources for sidelink communication among the UEs 715. The shared resources may include control resources, including multiple control blocks, and data resources, as described with reference to greater detail with respect to FIG. 3. The UEs 715 may identify a priority schedule that indicates which UE 715 may attempt to claim the data resources over each control block of the control resources. The base station 705 may transmit the priority schedule to the UEs 715 or the UEs 715 may determine the priority scheduled autonomously or based on a preconfigured priority schedule, among other examples, as described with reference to greater detail with respect to FIG. 3. At least some, if not all, of the UEs 715 may perform one or more beam training procedures, to identify which beams 720 to use for communicating with each other. For instance, the UE 715-*b* may determine which beam 720 to use to communicate with each of the UE 715-*a*, the UE 715-*c*, and the UE 715-*d*. To communicate with the UE 715-*a*, the UE 715-*b* may use the beam 720-*b* to receive sidelink transmissions from the UE 715-*a* or transmit sidelink communications to the UE 715-*a*.

In some examples, the UEs 715 may use their beams 720 based on a priority schedule, or previously scheduled transmissions, or both. For instance, the UEs 715 may determine, according to a priority schedule, that the UE 715-*a* is scheduled to attempt to claim the data resources over a control block (for example, over a slot in the control resources). Based on the priority schedule, the UE 715-*b* may use the beam 720-*b* on the UE 715-*a*, to determine whether it is the target UE 715 of the UE 715-*a*. The UE 715-*d* may be scheduled to receive another data transmission from the UE 715-*c* on the beam 720-*c*. That is, over a previous slot, the UE 715-*c* may have transmitted a sidelink request on the beam 720-*c*, the UE 715-*d* may have received the sidelink request and may have transmitted a positive sidelink response to the UE 715-*c* on the beam 720-*c*, and the UE 715-*c* may have transmitted a sidelink confirmation to the UE 715-*d* on the beam 720-*c*. Thus, over the current slot, the UE 715-*d* may maintain beam 720-*d* trained on the UE 715-*c* and may monitor for a sidelink request (for example, from the UE 715-*a*) on the beam 720-*d*. In some examples, the UE 715-*b* may also receive the sidelink confirmation from the UE 715-*c* on the beam 720-*b* at a high receive power, and may determine that the UE 715-*c* has successfully reserved a subset of the data resources for a data transmission to be transmitted on the beam 720-*c*.

The UE 715-*a* may transmit a sidelink request to the UE 715-*b* on the beam 720-*a*. The UE 715-*b* may monitor for and receive the sidelink request over a first portion of the slot on the beam 720-*b*. The UE 715-*b* may determine, based on the sidelink request, that it is the target UE 715 for the UE 715-*a*. But the UE 715-*b* may also determine, based on the sidelink confirmation previously received from the UE 715-*c*, that a data transmission from the UE 715-*c* will cause a high level of interference on the beam 720-*b* with a data transmission from the UE 715-*a* on the beam 720-*b*. For example, the UE 715-*b* may perform interference level measurements (for example, determine a receive power, a transmission power, a signal-to-noise ratio (SNR), a signal-to-interference-plus-noise ratio (SINR) among other examples, on both the sidelink confirmation received from the UE 715-*c* and the sidelink request received from the UE 715-*a* on the beam 720-*b*.

In some examples, the UE 715-*b* may compare the measured interference levels for the UE 715-*a* and the UE 715-*c*, and may determine based on the measurements that a data transmission from the UE 715-*a* will experience a high level of interference on the beam 720-*b* from the data transmission from the UE 715-*c* on the beam 720-*b*. In such examples, even though the UE 715-*b* is available for a data transmission from the UE 715-*a* (for example, is not scheduled for a data transmissions), the UE 715-*b* may refrain from transmitting a positive sidelink response over the second portion of the slot. In some examples, the UE 715-*d* may also receive the sidelink request from the UE 715-*a* on the beam 720-*d*. Because the UE 715-*d* is already scheduled to receive a data transmission from the UE 715-*c* on the beam 720-*d*, the UE 715-*d* may transmit a negative sidelink response to the UE 715-*a*.

The UE 715-*a* may determine whether to transmit the data transmission to the UE 715-*b* based on monitoring for sidelink responses from other UEs 715. For example, the UE 715-*a* may not receive a positive sidelink response from the UE 715-*b* (for example, because the UE 715-*b* previously received a sidelink confirmation from the UE 715-*c* at a high receive power on beam 720-*b* which can be used to receive from either the UE 715-*a* or the UE 715-*c* and that an SINR value for a data transmission from the UE 715-*c* would be too high) over the second portion of the slot. In such cases, regardless of whether the UE 715-*a* receives a negative sidelink request from the UE 715-*d*, the UE 715-*a* may refrain from transmitting a sidelink confirmation to the UE 715-*b* over a third portion of the slot. The UE 715-*b* may monitor for the sidelink confirmation, and upon not receiving it, may determine not to monitor for a data transmission over the subset of the sidelink resources.

Figure 8:
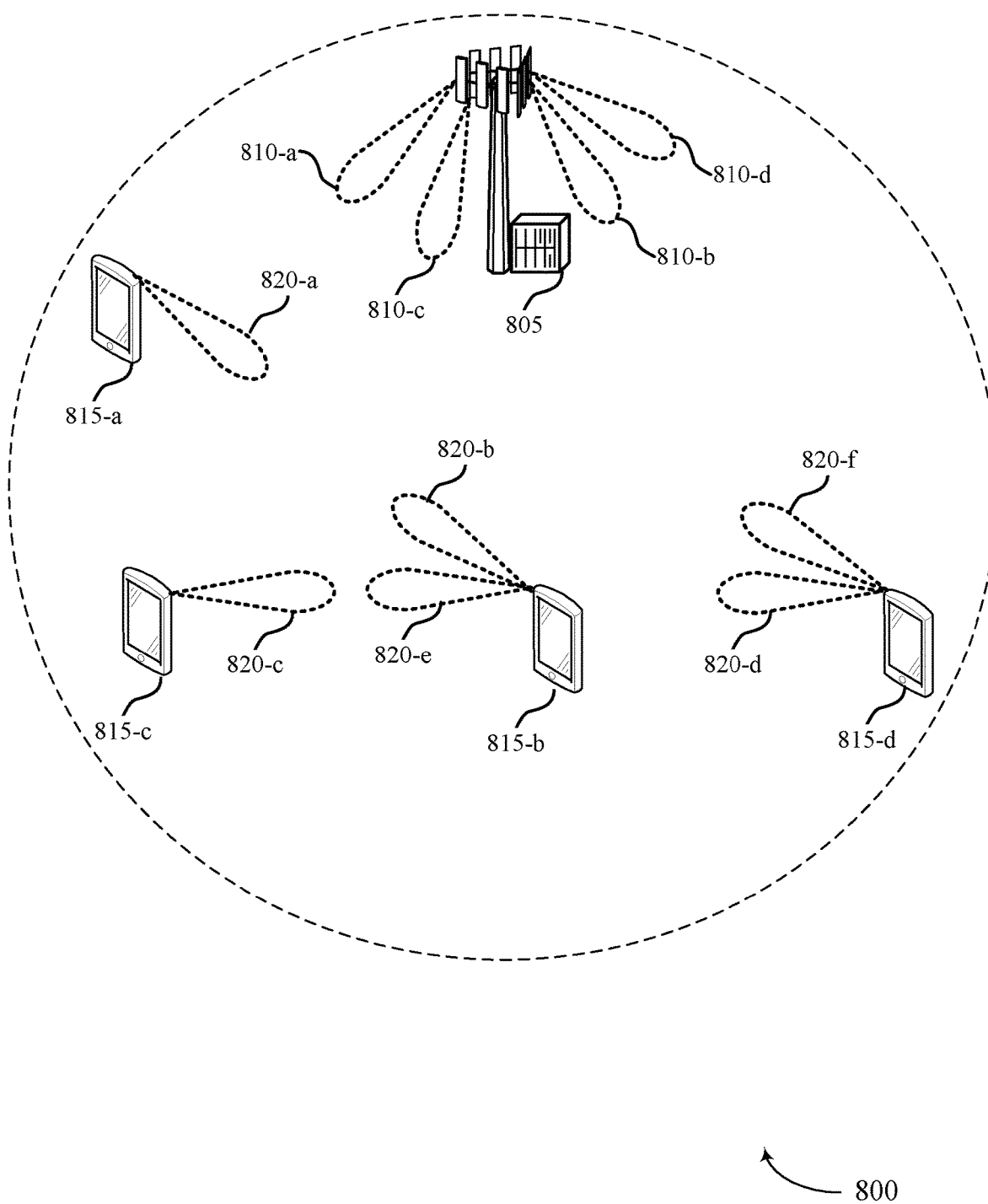
FIG. 8 illustrates an example of a wireless communications system that supports distributed sidelink resource allocation in accordance with aspects of the present disclosure.

FIG. 8 illustrates an example of a wireless communications system 800 that supports distributed sidelink resource allocation in accordance with aspects of the present disclosure. In some examples, wireless communications system 800 may implement aspects of wireless communications systems 100, 200, and 400-700.

In some examples, a base station 805 may communicate with one or more of the UEs 815. The base station 805 may transmit downlink signals on one or more beams 810. For example, the base station 805 may communicate with the UE 815-*a* on the beam 810-*a*, may communicate with the UE 815-*b* on the beam 810-*b*, may communicate with the UE 815-*c* on the beam 810-*c*, and may communicate with the UE 815-*d* on the beam 810-*d*. In some examples, the base station 805 may allocate shared resources for sidelink communication among the UEs 815. The shared resources may include control resources, including multiple control blocks, and data resources, as described with reference to greater detail with respect to FIG. 3.

The UEs 815 may identify a priority schedule that indicates which UE 815 may attempt to claim the data resources over each control block of the control resources. The base station 805 may transmit the priority schedule to the UEs 815, or the UEs 815 may determine the priority scheduled autonomously or based on a preconfigured priority schedule, among other examples, as described with reference to greater detail with respect to FIG. 3. The UEs 815 may perform one or more beam training procedures, to identify which beams 820 to use for communicating with each other. For instance, the UE 815-*b* may determine which beam 820 to use to communicate with each of the UE 815-*a*, the UE 815-*c*, and the UE 815-*d*. To communicate with the UE 815-*a*, the UE 815-*b* may use the beam 820-*b* to receive sidelink transmissions from the UE 815-*a* or transmit sidelink communications to the UE 815-*a*. To communicate with the UE 815-*c*, the UE 815-*b* may use the beam 820-*e* to receive sidelink transmissions from the UE 815-*c* or transmit sidelink communications to the UE 815-*c*.

In some examples, the UEs 815 may use their beams 820 based on a priority schedule, or previously scheduled transmissions, or both. For instance, the UEs 815 may determine, according to a priority schedule, that the UE 815-*a* is scheduled to attempt to claim the data resources over a control block (for example, over a slot in the control resources). Based on the priority schedule, the UE 815-*b* may use the beam 820-*b* on the UE 815-*a*, to determine whether it is the target UE 815 of the UE 815-*a*. The UE 815-*d* may be scheduled to receive another data transmission from the UE 815-*c* on the beam 820-*c*. That is, over a previous slot, the UE 815-*c* may have transmitted a sidelink request on the beam 820-*c*, the UE 815-*d* may have received the sidelink request and may have transmitted a positive sidelink response to the UE 815-*c* on the beam 820-*d*, and the UE 815-*c* may have transmitted a sidelink confirmation to the UE 815-*d* on the beam 820-*c*. Thus, over the current slot, the UE 815-*d* may maintain beam 820-*d* trained on the UE 815-*c*, and may monitor for a sidelink request (for example, from the UE 815-*a*) on the beam 820-*d*. In some examples, the UE 815-*b* may also receive the sidelink confirmation from the UE 815-*c* on the beam 820-*e* at a high receive power, and may determine that the UE 815-*c* has successfully reserved a subset of the data resources for a data transmission to be transmitted on the beam 820-*c*.

The UE 815-*b* may determine whether a data transmission from the UE 815-*c* to the UE 815-*d* will interfere with a potential data transmission from the UE 815-*a* on the beam 820-*b*. The UE 815-*b* may receive, over a first portion of the slot, a sidelink request from the UE 815-*a* on the beam 820-*b*. The UE 815-*b* may determine, from the sidelink request, that it is the target UE 815 for the UE 815-*a*. The UE 815-*b* may be otherwise available (for example, not scheduled by another UE 815) for a data transmission from the UE 815-*a* on the beam 820-*b*. However, the UE 815-*b* may have previously received the sidelink confirmation from the UE 815-*c* on the beam 820-*e*.

In some examples, beam 820-*b* and beam 820-*e* may be spatially similar. For example, beam 820-*e* and beam 820-*b* may have small angular difference. For example, beam 820-*e* and beam 820-*b* may partially or completely overlap spatially. Thus, a data transmission on the beam 820-*e* may interfere with a data transmission on the beam 820-*b*. The UE 815-*b* may determine an interference level (for example, a transmit power, a receive power, an SNR, or an SINR, among other examples) for the sidelink confirmation received from the UE 815-*c*, the sidelink request received from the UE 815-*a*, or both. In some examples, the UE 815-*b* may determine whether data transmissions from the UE 815-*a* and the UE 815-*c* will interfere with each other based on an angular difference between beam 820-*b* and beam 820-*e*. For instance, if the angular difference between beam 820-*b* and the beam 820-*e* is sufficiently high (for example, exceeds or satisfies a threshold angular difference), then a primary lobe of beam 820-*b* and a primary lobe of beam 820-*e* may not overlap. In such instances, simultaneous transmissions received on the beam 820-*b* and beam 820-*e* may not interfere with each other. However, if the angular difference between beam 820-*b* and beam 820-*e* is not sufficiently high (for example, does not satisfy or is less than a threshold angular difference), then the primary lobe of beam 820-*b* and the primary lobe of beam 820-*e* may partially or completely overlap, resulting in interference. The UE 815-*b* may determine, based on determining the interference level, angular difference, or both, whether it is able to receive a data transmission from the UE 815-*a* on the beam 820-*b* without interference from a data transmission from the UE 815-*c* on the beam 820-*e* (for example, at an SINR level that satisfies an interference level threshold). If the UE 815-*b* determines that it can successfully receive a data transmission from the UE 815-*a* on the beam 820-*b*, then the UE 815-*b* may transmit a positive sidelink response to the UE 815-*a* on the beam 820-*b*. If the UE 815-*b* determines that it cannot successfully receive a data transmission from the UE 815-*a*, the UE 815-*b* may refrain from transmitting a positive sidelink response to the UE 815-*a* on the beam 820-*b*.

In some examples, a UE 815 may transmit a sidelink response on a different beam 820 than the beam 820 on which it measures interference. For example, the UE 815-*d* may be scheduled to receive a data transmission from the UE 815-*c* on the beam 820-*d*. Thus, the UE 815-*d* may monitor for the sidelink request from the UE 815-*a* on the beam 820-*d*. The UE 815-*d* may determine that it is not the target UE 815 for the UE 815-*a* based on the received sidelink request. However, the UE 815-*d* may determine that a data transmission on the subset of data resources from the UE 815-*a* to the UE 815-*b* may interfere with the previously scheduled data transmission from the UE 815-*c* on the beam 820-*d*. The UE 815-*d* may make this determination based on measured interference levels, angular difference between the beam 820-*d*, the beam 820-*f*, or both. The UE 815-*d* may object to a data transmission from the UE 815-*a* to the UE 815-*b*, and may transmit a negative sidelink response to the UE 815-*a*. However, to ensure that UE 815-*a* receives the negative sidelink response, the UE 815-*d* may transmit the negative sidelink response to the UE 815-*a* on the beam 820-*f* over the second portion of the slot, instead of on the beam 820-*d* (for example, the beam 820 on which it measured interference from the UE 815-*c*). The UE 815-*a* may receive the negative sidelink response from the UE 815, and may refrain from transmitting the sidelink confirmation to the UE 815-*b* over the third portion of the slot, indicating that it has aborted the data transmission on the subset of the data resources.

As illustrated and described with respect to FIGS. 2-8, a target UE 815 may transmit a positive sidelink response to indicate its availability and refrain from transmitting a positive sidelink response to indicate its unavailability. Similarly, a non-target UE 815 may transmit a negative sidelink response to indicate an objection to a data transmission, or may refrain from transmitting a negative sidelink response to indicate a tolerance of a data transmission. That is, a non-target UE 815 may refrain from transmitting a negative sidelink response if it has no objection (for example, a previously scheduled data transmission or an interference level, among other examples) to a data transmission from the UE 815 that transmitted the sidelink request.

Additionally, or alternatively, in some examples, such a signaling scheme could be altered to achieve the same affect. That is, each of the techniques and methods described with respect to FIGS. 2-8 could also be implemented in similar fashion in which a target UE 815 may refrain from transmitting a negative sidelink response to indicate its availability (for example, instead of refraining from transmitting a positive sidelink response) and transmit a negative sidelink response to indicate its unavailability (for example, instead of transmitting a positive sidelink response), and a non-target UE 815 may transmit a positive sidelink response to indicate an acceptance or tolerance of a data transmission (for example, instead of refraining from transmitting a negative sidelink repose) and refrain from transmitting a positive sidelink repose to indicate an objection to a data transmission (for example, instead of transmitting a negative sidelink response).

Additionally, or alternatively, in some examples, each of the UEs 815 may be configured to respond actively to every received sidelink request. For instance, the UE 815-*a* may transmit a sidelink request to UE 815-*b*. If UE 815-*b* is available for a data transmission from the UE 815-*a*, then the UE 815-*a* may transmit a positive sidelink response to the UE 815-*a*. If the UE 815-*b* is not available for a data transmission from the UE 815-*a*, then the UE 815-*b* may refrain from transmitting a positive sidelink transmission, as described with reference to greater detail herein. In some examples, if the UE 815-*b* is not available for a data transmission, then the UE 815-*b* may transmit a negative sidelink response to the UE 815-*a*. In some examples, the UE 815-*c* may not be the target UE 815 for the UE 815-*a*. The UE 815-*c* may receive the sidelink request from the UE 815-*a*. As described with reference to greater detail herein, if the UE 815-*c* has no object to a data transmission from the UE 815-*a* to the UE 815-*b*, then the UE 815-*c* may refrain from transmitting a negative sidelink response. However, in some examples, the UE 815-*c* may transmit a positive sidelink response if it has no objection to the data transmission form the UE 215-*a* to the UE 815-*b*. That is, each UE 815 that receives a sidelink request from the UE 815-*a* may transmit a positive sidelink response in the absence of interference, conflicting transmissions, or other reasons to object to a data transmission, or may transmit a negative sidelink response if there is interference, conflicting transmission scheduled, or other reasons to object to the data transmission.

Figure 9:
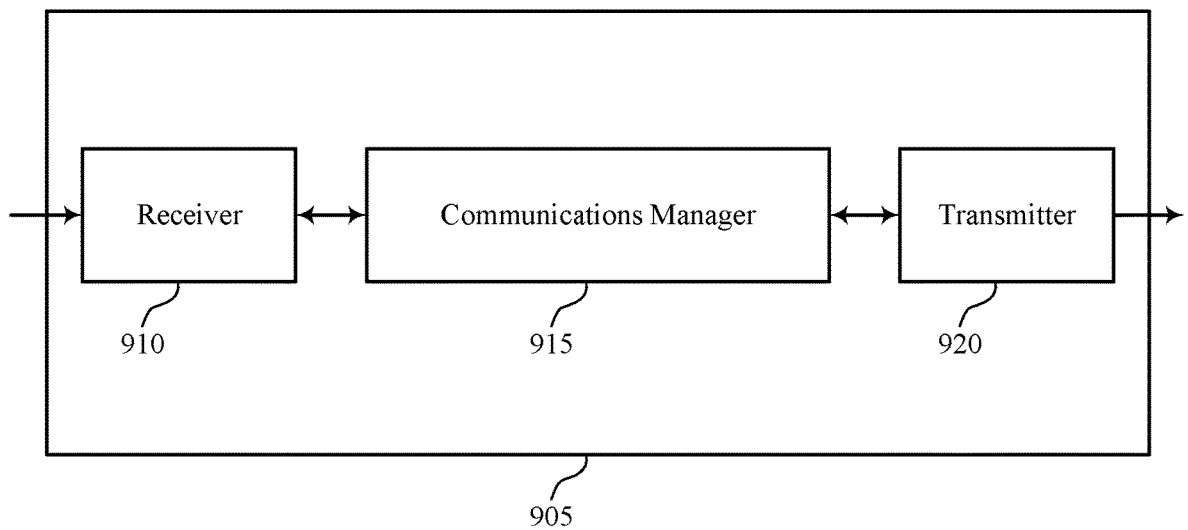
FIGS. 9 and 10 show block diagrams of devices that support distributed sidelink resource allocation in accordance with aspects of the present disclosure.

FIG. 9 shows a block diagram of a device 905 that supports distributed sidelink resource allocation in accordance with aspects of the present disclosure. The device 905 may be an example of aspects of a UE 115. The device 905 may include a receiver 910, a communications manager 915, and a transmitter 920. The communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to distributed sidelink resource allocation). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine shared resources for communicating over one or more sidelink communication links, the shared resources including control resources and data resources, transmit, to a second UE on a transmission beam over control resources in a first portion of a slot, a sidelink request to reserve a subset of the data resources, monitor, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both, and determine, based on the monitoring, whether to transmit a sidelink confirmation indicating a reservation of the subset of the data resources to the second UE over control resources in a third portion of the slot. The communications manager 915 may also determine shared resources for communicating over one or more sidelink communication links, the shared resources including control resources and data resources, monitor, on a receive beam over control resources in a first portion of a slot, for a sidelink request to reserve a subset of the data resources from a first UE, receive, based on the monitoring, the sidelink request from the first UE, the sidelink request indicating that the second UE is a target UE of the sidelink request, and determine, based on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources. The communications manager 915 may also determine shared resources for communicating over one or more sidelink communication links, the shared resources including control resources and data resources, monitor, on a receive beam over control resources in a first portion of a slot, for a sidelink request to reserve a subset of the data resources, receive, based on the monitoring, the sidelink request from the first UE, the sidelink request indicating that a second UE is a target UE of the sidelink request, and determine, based on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources. The communications manager 915 may be an example of aspects of the communications manager 1210 described herein.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and transmitter 920 may be implemented as analog components (for example, amplifiers, filters, antennas) coupled with the mobile device modem to enable wireless transmission and reception over one or more bands.

The communications manager 915 may be implemented to realize one or more potential advantages. The described techniques may support increased efficiency, increased power savings, and improved user experience. The communications manager 915 may also support improvements in system efficiency such that sidelink UEs 115 may efficiently use resources and avoid interference. The described techniques may also promote power saving at one or more UEs, and efficient use of computational resources.

Based on techniques for efficiently communicating maximum quantity of layers for a device, a processor of a UE 115 (for example, controlling the receiver 910, the transmitter 920, or a uplink transmission manager 1220 as described with respect to FIG. 7) may increase system efficiency and decrease unnecessary processing at a device.

Figure 10:
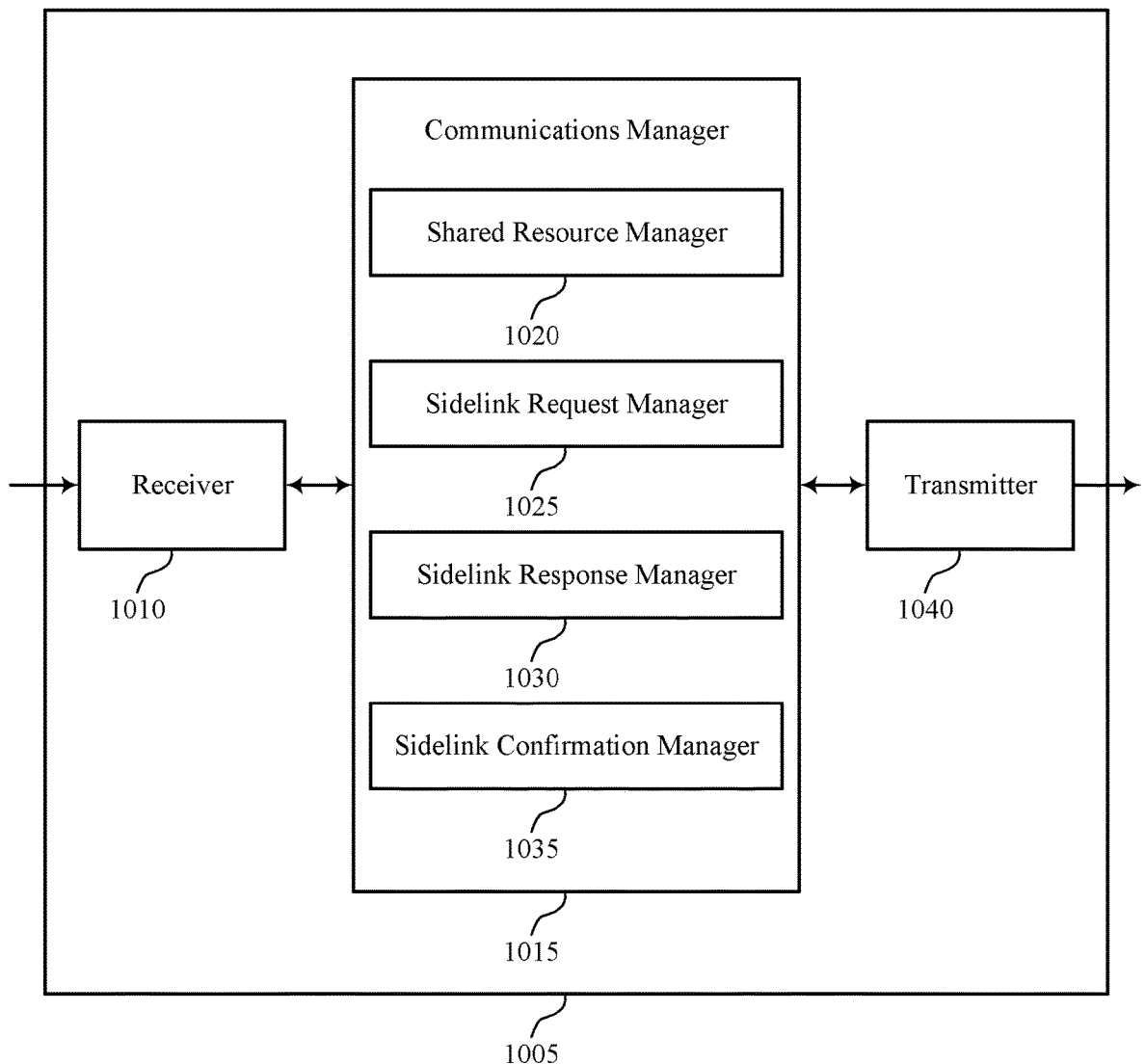

FIG. 10 shows a block diagram of a device 1005 that supports distributed sidelink resource allocation in accordance with aspects of the present disclosure. The device 1005 may be an example of aspects of a device 905, or a UE 115. The device 1005 may include a receiver 1010, a communications manager 1015, and a transmitter 1040. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to distributed sidelink resource allocation). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915. The communications manager 1015 may include a shared resource manager 1020, a sidelink request manager 1025, a sidelink response manager 1030, and a sidelink confirmation manager 1035. The communications manager 1015 may be an example of aspects of the communications manager 1210 described herein.

The shared resource manager 1020 may determine shared resources for communicating over one or more sidelink communication links, the shared resources including control resources and data resources.

The sidelink request manager 1025 may transmit, to a second UE on a transmission beam over control resources in a first portion of a slot, a sidelink request to reserve a subset of the data resources.

The sidelink response manager 1030 may monitor, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both.

The sidelink confirmation manager 1035 may determine, based on the monitoring, whether to transmit a sidelink confirmation indicating a reservation of the subset of the data resources to the second UE over control resources in a third portion of the slot.

The shared resource manager 1020 may determine shared resources for communicating over one or more sidelink communication links, the shared resources including control resources and data resources.

The sidelink request manager 1025 may monitor, on a receive beam over control resources in a first portion of a slot, for a sidelink request to reserve a subset of the data resources from a first UE and receive, based on the monitoring, the sidelink request from the first UE, the sidelink request indicating that the second UE is a target UE of the sidelink request.

The sidelink response manager 1030 may determine, based on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources.

The shared resource manager 1020 may determine shared resources for communicating over one or more sidelink communication links, the shared resources including control resources and data resources.

The sidelink request manager 1025 may monitor, on a receive beam over control resources in a first portion of a slot, for a sidelink request to reserve a subset of the data resources and receive, based on the monitoring, the sidelink request from the first UE, the sidelink request indicating that a second UE is a target UE of the sidelink request.

The sidelink response manager 1030 may determine, based on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources.

The transmitter 1040 may transmit signals generated by other components of the device 1005. In some examples, the transmitter 1040 may be collocated with a receiver 1010 in a transceiver component. For example, the transmitter 1040 may be an example of aspects of the transceiver 1220 described with reference to FIG. 12. The transmitter 1040 may utilize a single antenna or a set of antennas.

Figure 11:
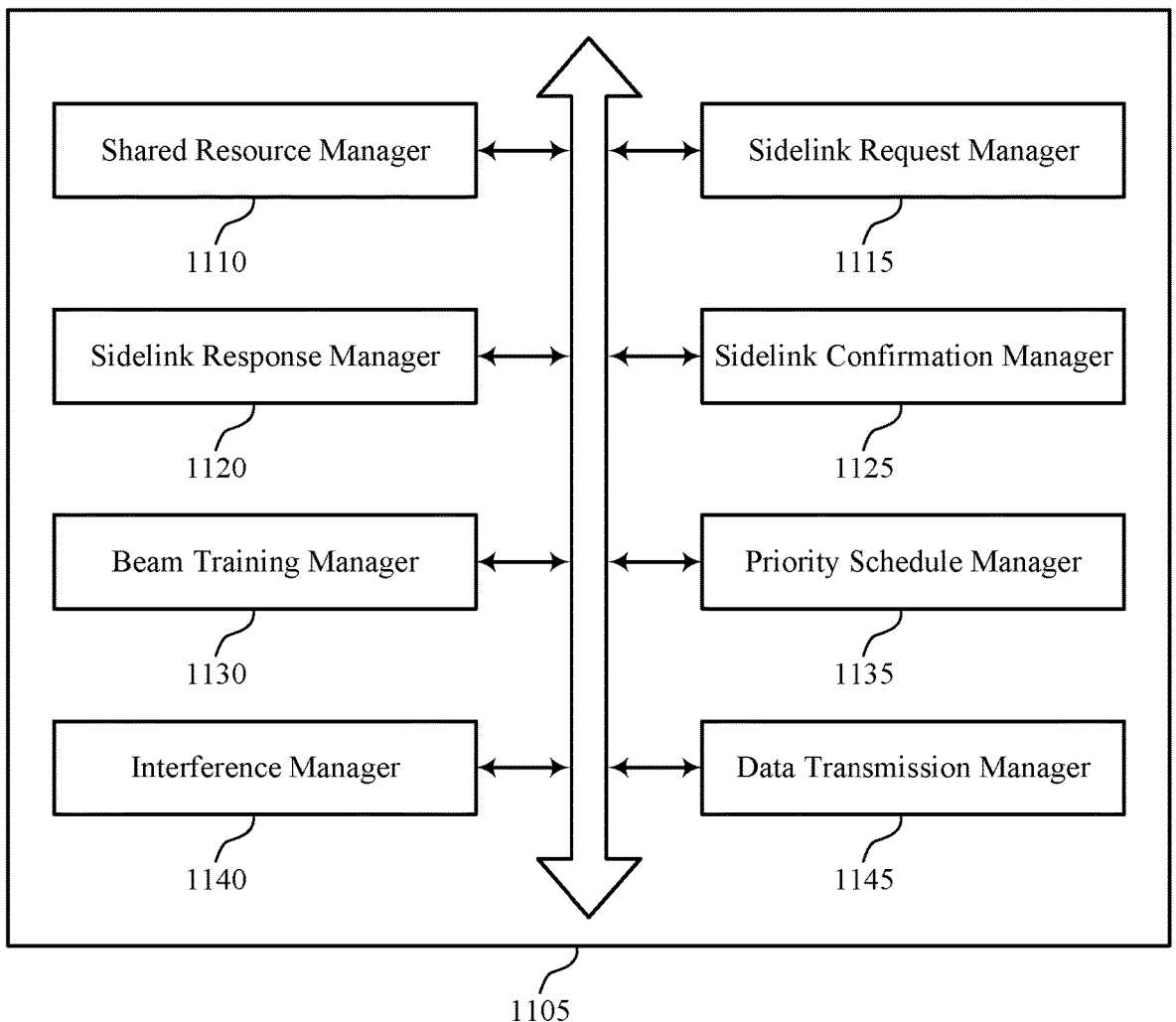
FIG. 11 shows a block diagram of a communications manager that supports distributed sidelink resource allocation in accordance with aspects of the present disclosure.

FIG. 11 shows a block diagram of a communications manager 1105 that supports distributed sidelink resource allocation in accordance with aspects of the present disclosure. The communications manager 1105 may be an example of aspects of a communications manager 915, a communications manager 1015, or a communications manager 1210 described herein. The communications manager 1105 may include a shared resource manager 1110, a sidelink request manager 1115, a sidelink response manager 1120, a sidelink confirmation manager 1125, a beam training manager 1130, a priority schedule manager 1135, an interference manager 1140, and a data transmission manager 1145. Each of these components may communicate, directly or indirectly, with one another (for example, via one or more buses).

The shared resource manager 1110 may determine shared resources for communicating over one or more sidelink communication links, the shared resources including control resources and data resources. In some examples, the shared resource manager 1110 may determine shared resources for communicating over one or more sidelink communication links, the shared resources including control resources and data resources. In some examples, the shared resource manager 1110 may determine shared resources for communicating over one or more sidelink communication links, the shared resources including control resources and data resources. In some examples, the shared resource manager 1110 may determine, based on receiving the sidelink request and the second sidelink request, that the second UE is not available for a data transmission using the subset of the data resources from the first UE. In some examples, determining whether to transmit the sidelink response to the first UE one the transmission beam is based on determining that the second UE is not available for the data transmission.

In some examples, the shared resource manager 1110 may determine, based on receiving the first sidelink confirmation, that the subset of the data resources are not available for a data transmission to the second UE using the transmission beam. In some examples, determining whether to transmit the sidelink response to the first UE is based on determining that the subset of the data resources are not available. In some examples, the shared resource manager 1110 may determine, based on the measuring, whether a data transmission by the first UE on the subset of the data resources satisfies an interference threshold. In some examples, determining whether to transmit the sidelink response to the first UE on the transmission beam is based on determining whether the data transmission by the first UE on the subset of the data resources satisfies the interference threshold.

The sidelink request manager 1115 may transmit, to a second UE on a transmission beam over control resources in a first portion of a slot, a sidelink request to reserve a subset of the data resources. In some examples, the sidelink request manager 1115 may monitor, on a receive beam over control resources in a first portion of a slot, for a sidelink request to reserve a subset of the data resources from a first UE. In some examples, the sidelink request manager 1115 may receive, based on the monitoring, the sidelink request from the first UE, the sidelink request indicating that the second UE is a target UE of the sidelink request. In some examples, the sidelink request manager 1115 may monitor, on a receive beam over control resources in a first portion of a slot, for a sidelink request to reserve a subset of the data resources. In some examples, the sidelink request manager 1115 may receive, based on the monitoring, the sidelink request from the first UE, the sidelink request indicating that a second UE is a target UE of the sidelink request.

In some examples, the sidelink request manager 1115 may receive, on a second receive beam over control resources in a first portion of a second slot, a second sidelink request to reserve the subset of the data resources from a third UE. In some examples, the sidelink request manager 1115 may receive, on the receive beam over control resources in a first portion of a second slot, a second sidelink request to reserve the subset of the data resources from a third UE. In some examples, the sidelink request manager 1115 may receive a unique identifier indicating that the that the second UE is the target UE of the sidelink request. In some examples, the sidelink request manager 1115 may determine, based on receiving the sidelink request, that the third UE is not the target UE of the sidelink request. In some examples, determining whether to transmit the sidelink response to the first UE is based on determining that the third UE is not the target UE. In some examples, the sidelink request manager 1115 may receive, on the receive beam over control resources in a first portion of a second slot, a second sidelink request to reserve the subset of the data resources.

The sidelink response manager 1120 may monitor, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both. In some examples, the sidelink response manager 1120 may determine, based on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources. In some examples, the sidelink response manager 1120 may determine, based on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources.

In some examples, the sidelink response manager 1120 may receive, based on the monitoring, a positive sidelink response of the one or more sidelink responses from the second UE. In some examples, the sidelink response manager 1120 may receive, based on the monitoring, a positive sidelink response of the one or more sidelink responses from the second UE. In some examples, the sidelink response manager 1120 may receive, based on the monitoring, a negative sidelink response of the one or more sidelink responses from a third UE. In some examples, determining, based on the monitoring, that none of the one or more sidelink responses have been received. In some examples, determining whether to transmit the sidelink confirmation includes determining not to transmit the sidelink confirmation based on determining that none of the one or more sidelink responses have been received.

In some examples, the sidelink response manager 1120 may transmit, based on determining whether to transmit the sidelink response, the sidelink response to the first UE on the transmission beam over the control resources in the second portion of the slot. In some examples, the sidelink response manager 1120 may transmit, based on determining the level of interference between the transmission from the third UE on the second receive beam and the transmission from the first UE on the receive beam, the positive sidelink response to the first UE on the transmission beam over the control resources in the second portion of the slot. In some examples, the sidelink response manager 1120 may transmit, based on the level of interference between the transmission from the third UE on the second receive beam and the transmission from the first UE on the receive beam, a second negative sidelink response to the third UE on a second transmission beam over control resources in a second portion of the second slot. In some examples, the sidelink response manager 1120 may transmit, to the third UE on the transmission beam over control resources in a second portion of the second slot, a second positive sidelink response.

In some examples, the sidelink response manager 1120 may refrain, based on determining that the second UE is not available for the data transmission using the subset of the data resources from the first UE, from transmitting the sidelink response to the first UE on the transmission beam over the control resources in the second portion of the slot. In some examples, the sidelink response manager 1120 may refrain, based on determining that the subset of the data resources are not available for the data transmission to the second UE using the transmission beam, from transmitting the sidelink response to the first UE. In some examples, the sidelink response manager 1120 may refrain, based on determining that the third UE is not the target UE, from transmitting the sidelink response to the first UE.

In some examples, the sidelink response manager 1120 may transmit, to a fourth UE on the transmission beam over control resources in a second portion of the second slot, a second positive sidelink response. In some examples, the sidelink response manager 1120 may refrain, based on the measuring, from transmitting the negative sidelink response to the first UE. In some examples, the sidelink response manager 1120 may transmit, based on the measuring, the negative sidelink response to the first UE. In some examples, the positive sidelink response and the negative sidelink response are multiplexed in the control resources in the second portion of the slot.

The sidelink confirmation manager 1125 may determine, based on the monitoring, whether to transmit a sidelink confirmation indicating a reservation of the subset of the data resources to the second UE over control resources in a third portion of the slot. In some examples, the sidelink confirmation manager 1125 may transmit, based on receiving the positive sidelink response from the second UE, the sidelink confirmation to the second UE over the control resources in the third portion of the slot. In some examples, the sidelink confirmation manager 1125 may refrain, based on receiving the positive sidelink response and the negative sidelink response, from transmitting the sidelink confirmation to the second UE over the control resources in the third portion of the slot.

In some examples, the sidelink confirmation manager 1125 may refrain from transmitting the sidelink confirmation to the second UE over the control resources in the third portion of the slot. In some examples, the sidelink confirmation manager 1125 may receive, based on the second positive sidelink response, a first sidelink confirmation indicating a reservation of the subset of the data resources on the receive beam over control resources in a third portion of the second slot. In some examples, monitoring for the sidelink request on the receive beam is based on receiving the first sidelink confirmation. In some examples, the sidelink confirmation manager 1125 may monitor, on the receive beam over control resources in a third portion of the slot, for a second sidelink confirmation from the first UE. In some examples, the sidelink confirmation manager 1125 may determine, based on monitoring for the second sidelink confirmation, that the first UE has not transmitted the second sidelink confirmation. In some examples, the sidelink confirmation manager 1125 may receive a first sidelink confirmation indicating a reservation of the subset of the data resources transmitted from a third UE to a fourth UE on the transmission beam over control resources in a third portion of a second slot. In some examples, the sidelink confirmation manager 1125 may receive, based on the second positive sidelink response, a first sidelink confirmation indicating a reservation of the subset of the data resources on the transmission beam over control resources in a third portion of the second slot. In some examples, monitoring for the sidelink request on the receive beam is based on receiving the first sidelink confirmation.

The beam training manager 1130 may perform a beam training procedure with UEs of a set of UEs including the second UE. In some examples, transmitting the sidelink request on the transmission beam is based on the beam training procedure.

The priority schedule manager 1135 may determine that the control resources in the first portion of the slot are allocated for sending the sidelink request by the first UE. In some examples, transmitting the sidelink request over the control resources in the first portion of the slot is based on the determining that the control resources in the first portion of the slot are allocated for sending the sidelink request by the first UE. In some examples, receiving, from a base station, a control resource allocation indicating that one or more slots in the control resources are allocated to a set of UEs for reserving the data resources. In some examples, the set of UEs includes the first UE and the second UE. In some examples, determining that the control resources in the first portion of the slot are allocated for sending the sidelink request by the first UE is based on the control resource allocation.

In some examples, the priority schedule manager 1135 may compare a UE identifier of the first UE to one or more UE identifiers of a set of UEs including the first UE and the second UE. In some examples, determining that the control resources in the first portion of the slot are allocated for sending the sidelink request by the first UE is based on the comparing. In some examples, the priority schedule manager 1135 may determine a rotating schedule for slot allocation. In some examples, determining that the control resources in the first portion of the slot are allocated for sending the sidelink request by the first UE is based on the rotating schedule. In some examples, the priority schedule manager 1135 may determine a preconfigured slot allocation assignment. In some examples, determining that the control resources in the first portion of the slot are allocated for sending the sidelink request by the first UE is based on the preconfigured slot allocation assignment. In some examples, the priority schedule manager 1135 may determine that the control resources in the first portion of the slot are allocated for sending the sidelink request by the first UE. In some examples, monitoring for the sidelink request over the control resources in the first portion of the slot is based on the determining that the control resources in the first portion of the slot are allocated for sending the sidelink request by the first UE. In some examples, receiving, from a base station, a control resource allocation indicating that one or more slots in the control resources are allocated to a set of UEs for reserving the data resources. In some examples, the set of UEs includes the first UE and the second UE. In some examples, determining that the control resources in the first portion of the slot are allocated for sending the sidelink request by the first UE is based on the control resource allocation.

In some examples, the priority schedule manager 1135 may compare a UE identifier of the second UE to one or more UE identifiers of a set of UEs including the first UE and the second UE. In some examples, determining that the control resources in the first portion of the slot are allocated for sending the sidelink request by the first UE is based on the comparing. In some examples, the priority schedule manager 1135 may determine a rotating schedule for slot allocation. In some examples, determining that the control resources in the first portion of the slot are allocated for sending the sidelink request by the first UE is based on the rotating schedule. In some examples, the priority schedule manager 1135 may determine a preconfigured slot allocation assignment. In some examples, determining that the control resources in the first portion of the slot are allocated for sending the sidelink request by the first UE is based on the preconfigured slot allocation assignment.

In some examples, the priority schedule manager 1135 may determine that the control resources in the first portion of the slot are allocated for sending the sidelink request by the first UE. In some examples, monitoring for the sidelink request over the control resources in the first portion of the slot is based on the determining that the control resources in the first portion of the slot are allocated for sending the sidelink request by the first UE. In some examples, receiving, from a base station, a control resource allocation indicating that one or more slots in the control resources are allocated to a set of UEs for reserving the data resources. In some examples, the set of UEs includes the first UE and the second UE. In some examples, determining that the control resources in the first portion of the slot are allocated for sending the sidelink request by the first UE is based on the control resource allocation. In some examples, the priority schedule manager 1135 may compare a UE identifier of the third UE to one or more UE identifiers of a set of UEs including the first UE and the third UE. In some examples, determining that the control resources in the first portion of the slot are allocated for sending the sidelink request by the first UE is based on the comparing.

In some examples, the priority schedule manager 1135 may determine a rotating schedule for slot allocation. In some examples, determining that the control resources in the first portion of the slot are allocated for sending the sidelink request by the first UE is based on the rotating schedule. In some examples, the priority schedule manager 1135 may determine a preconfigured slot allocation assignment. In some examples, determining that the control resources in the first portion of the slot are allocated for sending the sidelink request by the first UE is based on the preconfigured slot allocation assignment.

The interference manager 1140 may determine, based on receiving the second sidelink request on the second receive beam, a level of interference between a transmission from the third UE on the second receive beam and a transmission from the first UE on the receive beam. In some examples, the interference manager 1140 may measure, based on receiving the sidelink request on the receive beam, a level of interference associated with the first UE on the receive beam.

The data transmission manager 1145 may receive, based on determining that the first UE has not transmitted the second sidelink confirmation, a data transmission from the third UE on the receive beam over the subset of the data resources.

Figure 12:
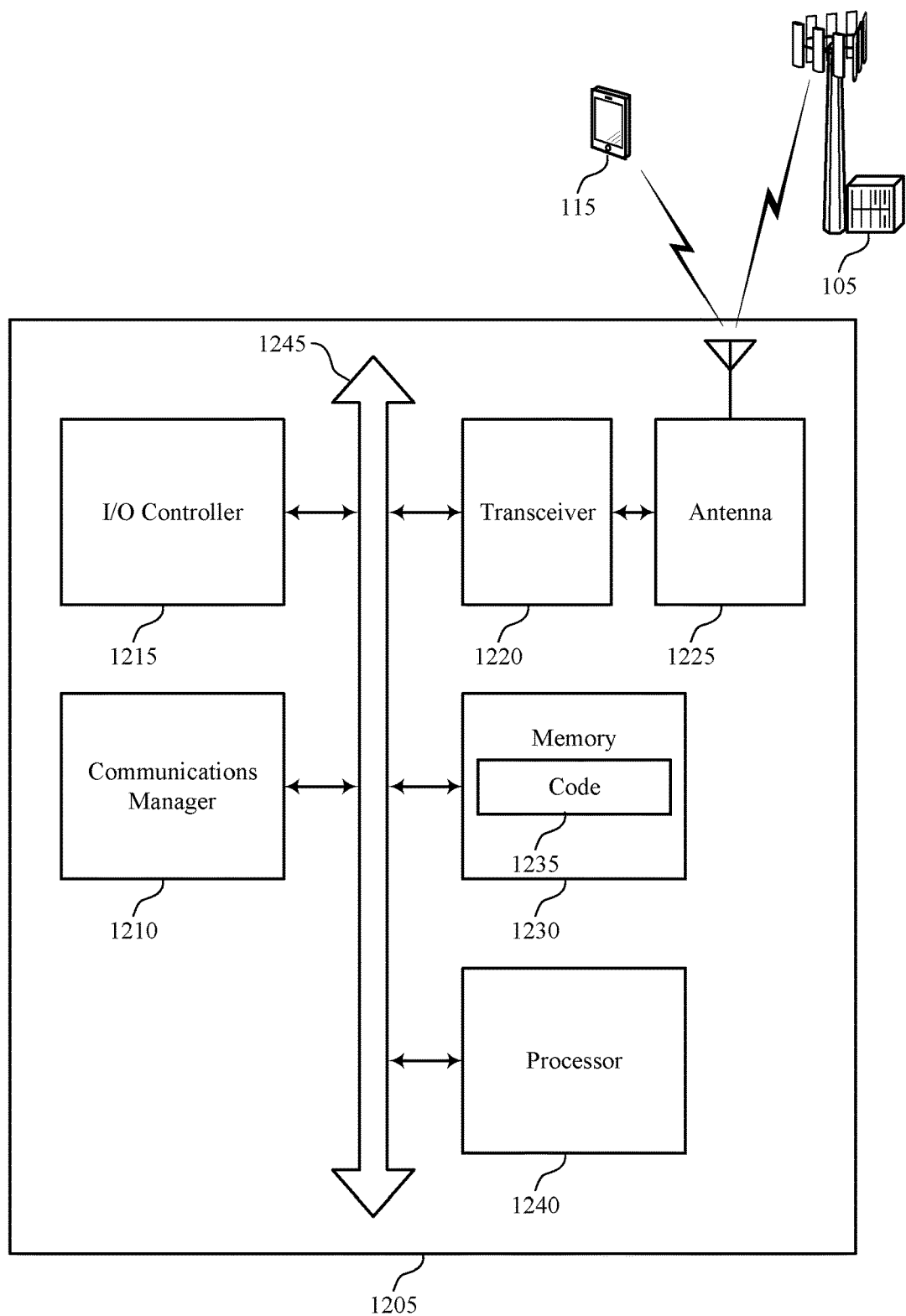
FIG. 12 shows a diagram of a system including a device that supports distributed sidelink resource allocation in accordance with aspects of the present disclosure.

FIG. 12 shows a diagram of a system including a device 1205 that supports distributed sidelink resource allocation in accordance with aspects of the present disclosure. The device 1205 may be an example of or include the components of device 905, device 1005, or a UE 115. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (for example, bus 1245).

The communications manager 1210 may determine shared resources for communicating over one or more sidelink communication links, the shared resources including control resources and data resources, transmit, to a second UE on a transmission beam over control resources in a first portion of a slot, a sidelink request to reserve a subset of the data resources, monitor, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both, and determine, based on the monitoring, whether to transmit a sidelink confirmation indicating a reservation of the subset of the data resources to the second UE over control resources in a third portion of the slot. The communications manager 1210 may also determine shared resources for communicating over one or more sidelink communication links, the shared resources including control resources and data resources, monitor, on a receive beam over control resources in a first portion of a slot, for a sidelink request to reserve a subset of the data resources from a first UE, receive, based on the monitoring, the sidelink request from the first UE, the sidelink request indicating that the second UE is a target UE of the sidelink request, and determine, based on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources. The communications manager 1210 may also determine shared resources for communicating over one or more sidelink communication links, the shared resources including control resources and data resources, monitor, on a receive beam over control resources in a first portion of a slot, for a sidelink request to reserve a subset of the data resources, receive, based on the monitoring, the sidelink request from the first UE, the sidelink request indicating that a second UE is a target UE of the sidelink request, and determine, based on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources.

The I/O controller 1215 may manage input and output signals for the device 1205. The I/O controller 1215 may also manage peripherals not integrated into the device 1205. In some examples, the I/O controller 1215 may represent a physical connection or port to an external peripheral. In some examples, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some examples, the I/O controller 1215 may be implemented as part of a processor. In some examples, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some examples, the wireless device may include a single antenna 1225. However, in some examples the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some examples, the memory 1230 may contain, among other things, a basic input/output (IO) system (BIOS) which may control basic hardware or software operation such as the interaction with peripheral components or devices.

The processor 1240 may include an intelligent hardware device, (for example, a general-purpose processor, a digital signal processor (DSP), a central processing unit (CPU), a microcontroller, an ASIC, an field-programmable gate array (FPGA), a programmable logic device, a discrete gate or transistor logic component, a discrete hardware component, or any combination thereof). In some examples, the processor 1240 may be configured to operate a memory array using a memory controller. In other cases, a memory controller may be integrated into the processor 1240. The processor 1240 may be configured to execute computer-readable instructions stored in a memory (for example, the memory 1230) to cause the device 1205 to perform various functions (for example, functions or tasks supporting distributed sidelink resource allocation).

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described herein.

Figure 13:
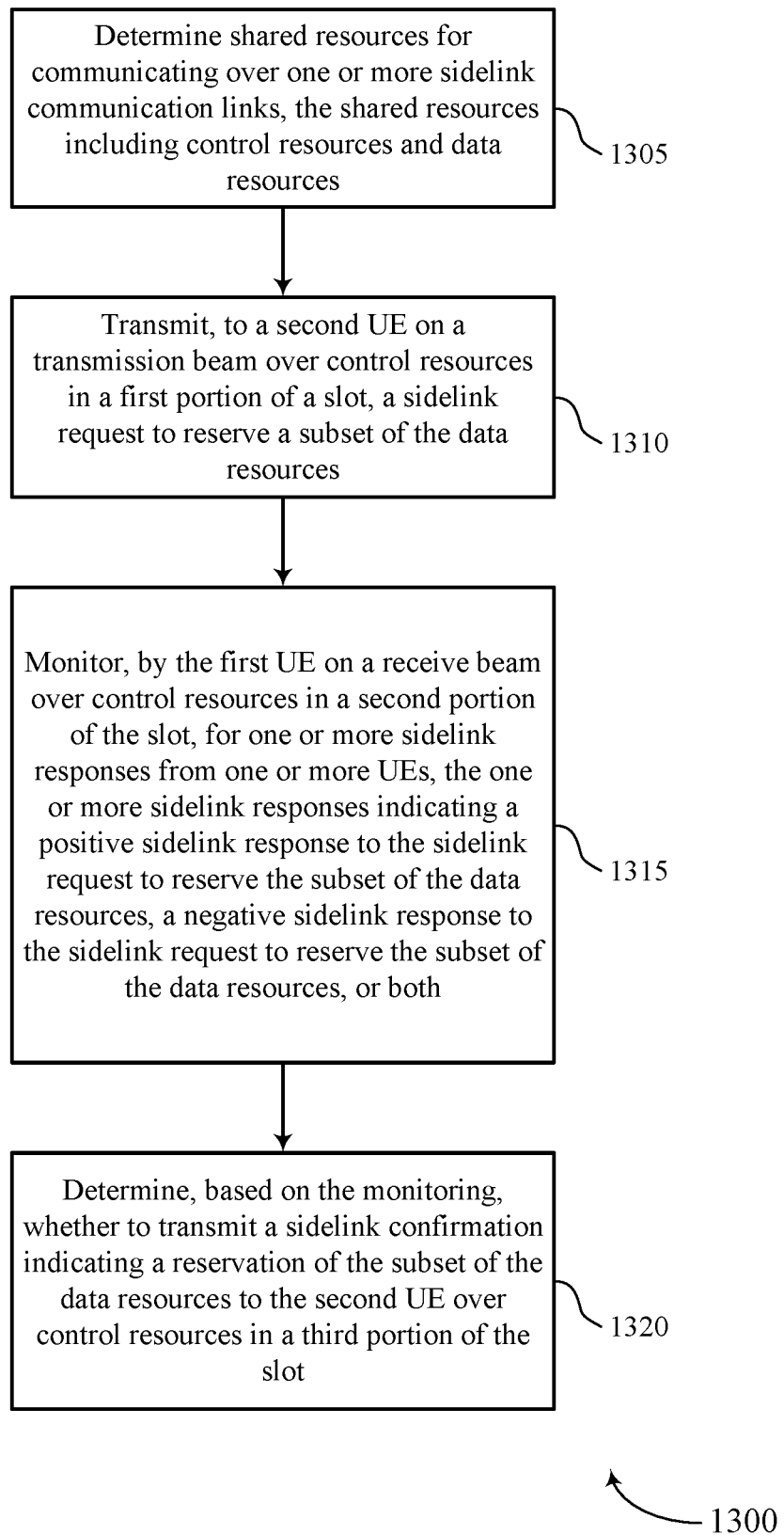
FIGS. 13 through 15 show flowcharts illustrating methods that support distributed sidelink resource allocation in accordance with aspects of the present disclosure.

FIG. 13 shows a flowchart 1300 illustrating a method that supports distributed sidelink resource allocation in accordance with aspects of the present disclosure. The operations of method 1300 may be implemented by a UE 115 or its components. For example, the operations of method 1300 may be performed by a communications manager as described with reference to FIGS. 9-12. In some examples, a UE may execute a set of instructions to control the functional elements of the UE to perform the functions described below. Additionally, or alternatively, a UE may perform aspects of the functions described below using special-purpose hardware.

At 1305, the UE may determine shared resources for communicating over one or more sidelink communication links, the shared resources including control resources and data resources. The operations of 1305 may be performed according to the methods described herein. In some examples, aspects of the operations of 1305 may be performed by a shared resource manager as described with reference to FIGS. 9-12.

At 1310, the UE may transmit, to a second UE on a transmission beam over control resources in a first portion of a slot, a sidelink request to reserve a subset of the data resources. The operations of 1310 may be performed according to the methods described herein. In some examples, aspects of the operations of 1310 may be performed by a sidelink request manager as described with reference to FIGS. 9-12.

At 1315, the UE may monitor, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both. The operations of 1315 may be performed according to the methods described herein. In some examples, aspects of the operations of 1315 may be performed by a sidelink response manager as described with reference to FIGS. 9-12.

At 1320, the UE may determine, based on the monitoring, whether to transmit a sidelink confirmation indicating a reservation of the subset of the data resources to the second UE over control resources in a third portion of the slot. The operations of 1320 may be performed according to the methods described herein. In some examples, aspects of the operations of 1320 may be performed by a sidelink confirmation manager as described with reference to FIGS. 9-12.

Figure 14:
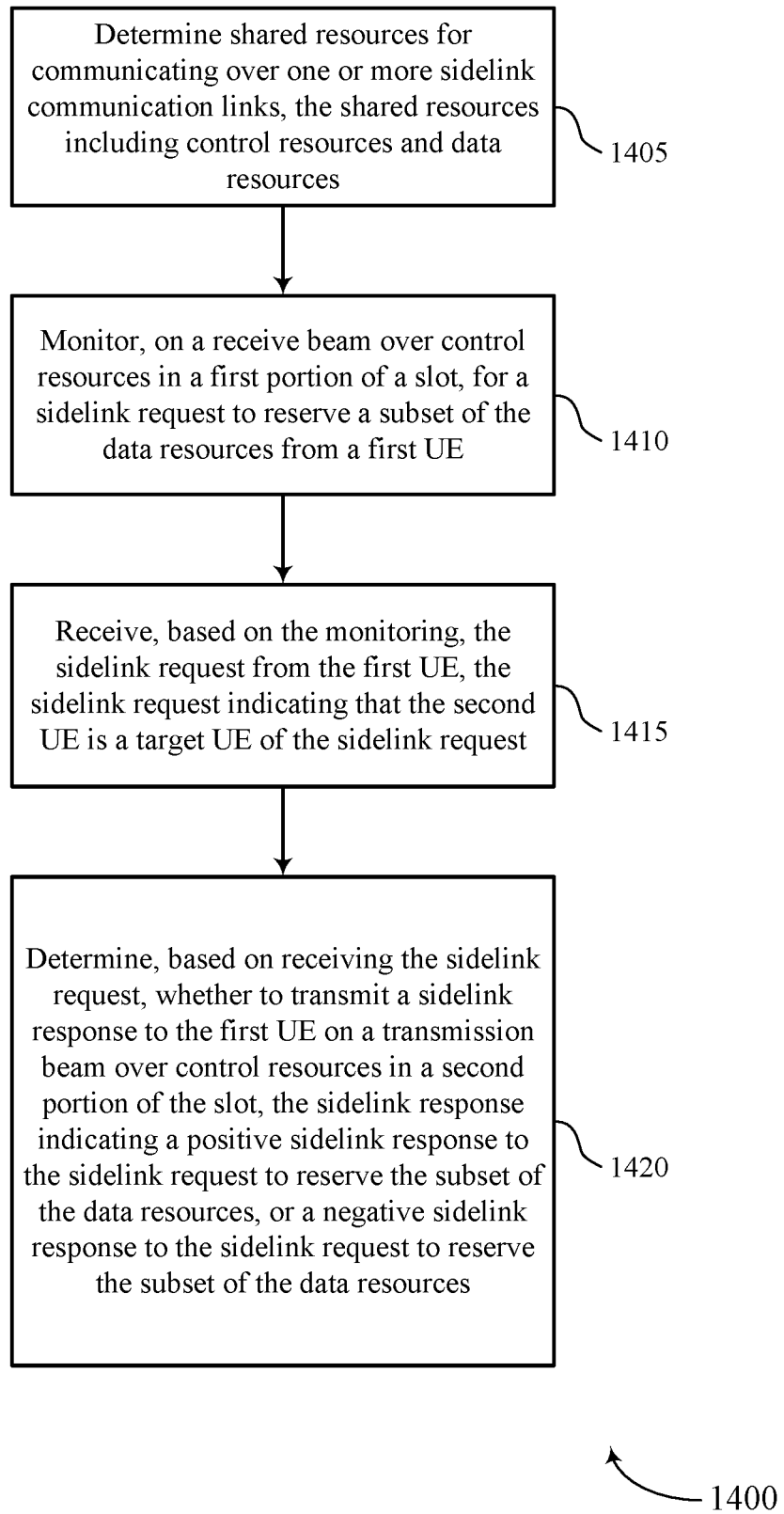

FIG. 14 shows a flowchart illustrating a method 1400 that supports distributed sidelink resource allocation in accordance with aspects of the present disclosure. The operations of method 1400 may be implemented by a UE 115 or its components. For example, the operations of method 1400 may be performed by a communications manager as described with reference to FIGS. 9-12. In some examples, a UE may execute a set of instructions to control the functional elements of the UE to perform the functions described below. Additionally, or alternatively, a UE may perform aspects of the functions described below using special-purpose hardware.

At 1405, the UE may determine shared resources for communicating over one or more sidelink communication links, the shared resources including control resources and data resources. The operations of 1405 may be performed according to the methods described herein. In some examples, aspects of the operations of 1405 may be performed by a shared resource manager as described with reference to FIGS. 9-12.

At 1410, the UE may monitor, on a receive beam over control resources in a first portion of a slot, for a sidelink request to reserve a subset of the data resources from a first UE. The operations of 1410 may be performed according to the methods described herein. In some examples, aspects of the operations of 1410 may be performed by a sidelink request manager as described with reference to FIGS. 9-12.

At 1415, the UE may receive, based on the monitoring, the sidelink request from the first UE, the sidelink request indicating that the second UE is a target UE of the sidelink request. The operations of 1415 may be performed according to the methods described herein. In some examples, aspects of the operations of 1415 may be performed by a sidelink request manager as described with reference to FIGS. 9-12.

At 1420, the UE may determine, based on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources. The operations of 1420 may be performed according to the methods described herein. In some examples, aspects of the operations of 1420 may be performed by a sidelink response manager as described with reference to FIGS. 9-12.

Figure 15:
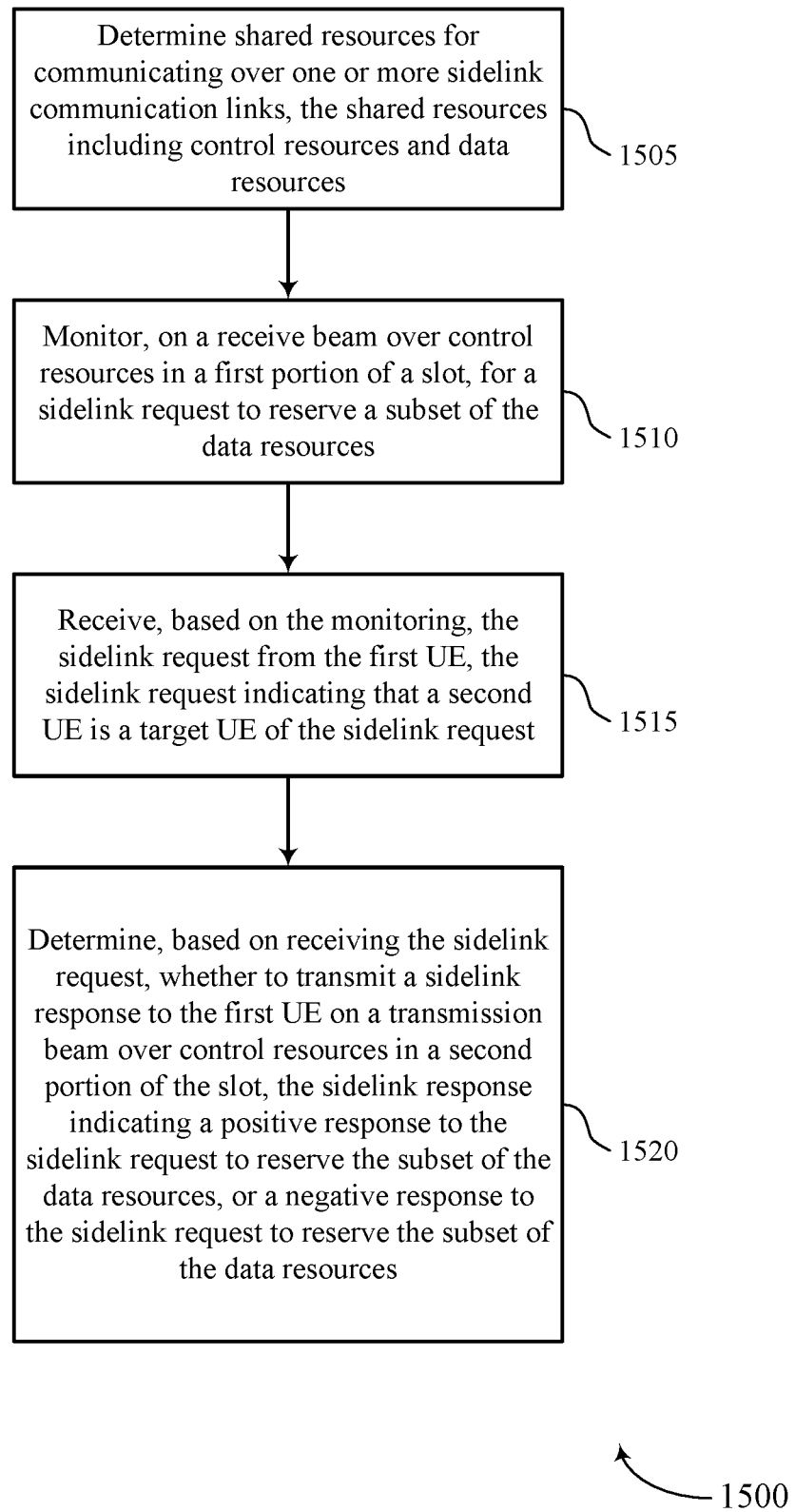

FIG. 15 shows a flowchart illustrating a method 1500 that supports distributed sidelink resource allocation in accordance with aspects of the present disclosure. The operations of method 1500 may be implemented by a UE 115 or its components. For example, the operations of method 1500 may be performed by a communications manager as described with reference to FIGS. 9-12. In some examples, a UE may execute a set of instructions to control the functional elements of the UE to perform the functions described below. Additionally, or alternatively, a UE may perform aspects of the functions described below using special-purpose hardware.

At 1505, the UE may determine shared resources for communicating over one or more sidelink communication links, the shared resources including control resources and data resources. The operations of 1505 may be performed according to the methods described herein. In some examples, aspects of the operations of 1505 may be performed by a shared resource manager as described with reference to FIGS. 9-12.

At 1510, the UE may monitor, on a receive beam over control resources in a first portion of a slot, for a sidelink request to reserve a subset of the data resources. The operations of 1510 may be performed according to the methods described herein. In some examples, aspects of the operations of 1510 may be performed by a sidelink request manager as described with reference to FIGS. 9-12.

At 1515, the UE may receive, based on the monitoring, the sidelink request from the first UE, the sidelink request indicating that a second UE is a target UE of the sidelink request. The operations of 1515 may be performed according to the methods described herein. In some examples, aspects of the operations of 1515 may be performed by a sidelink request manager as described with reference to FIGS. 9-12.

At 1520, the UE may determine, based on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources. The operations of 1520 may be performed according to the methods described herein. In some examples, aspects of the operations of 1520 may be performed by a sidelink response manager as described with reference to FIGS. 9-12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first UE, comprising: determining shared resources for communicating over one or more sidelink communication links, the shared resources comprising control resources and data resources; transmitting, to a second UE on a transmission beam over control resources in a first portion of a slot, a sidelink request to reserve a subset of the data resources; monitoring, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both; and determining, based at least in part on the monitoring, whether to transmit a sidelink confirmation indicating a reservation of the subset of the data resources to the second UE over control resources in a third portion of the slot.

Aspect 2: The method of aspect 1, further comprising: receiving, based at least in part on the monitoring, a positive sidelink response of the one or more sidelink responses from the second UE; and transmitting, based at least in part on receiving the positive sidelink response from the second UE, the sidelink confirmation to the second UE over the control resources in the third portion of the slot.

Aspect 3: The method of any of aspects 1 through 2, further comprising: receiving, based at least in part on the monitoring, a positive sidelink response of the one or more sidelink responses from the second UE; receiving, based at least in part on the monitoring, a negative sidelink response of the one or more sidelink responses from a third UE; and refraining, based at least in part on receiving the positive sidelink response and the negative sidelink response, from transmitting the sidelink confirmation to the second UE over the control resources in the third portion of the slot.

Aspect 4: The method of aspect 3, wherein the positive sidelink response and the negative sidelink response are multiplexed in the control resources in the second portion of the slot.

Aspect 5: The method of any of aspects 1 through 4, further comprising: determining, based at least in part on the monitoring, that none of the one or more sidelink responses have been received, wherein determining whether to transmit the sidelink confirmation comprises determining not to transmit the sidelink confirmation based at least in part on determining that none of the one or more sidelink responses have been received; and refraining from transmitting the sidelink confirmation to the second UE over the control resources in the third portion of the slot.

Aspect 6: The method of any of aspects 1 through 5, further comprising performing a beam training procedure with UEs of a set of UEs comprising the second UE, wherein transmitting the sidelink request on the transmission beam is based at least in part on the beam training procedure.

Aspect 7: The method of any of aspects 1 through 6, further comprising determining that the control resources in the first portion of the slot are allocated for sending the sidelink request by the first UE, wherein transmitting the sidelink request over the control resources in the first portion of the slot is based at least in part on the determining that the control resources in the first portion of the slot are allocated for sending the sidelink request by the first UE.

Aspect 8: The method of aspect 7, further comprising receiving, from a base station, a control resource allocation indicating that one or more slots in the control resources are allocated to a set of UEs for reserving the data resources, wherein the set of UEs comprises the first UE and the second UE, determining that the control resources in the first portion of the slot are allocated for sending the sidelink request by the first UE is based at least in part on the control resource allocation.

Aspect 9: The method of any of aspects 7 through 8, further comprising comparing a UE identifier of the first UE to one or more UE identifiers of a set of UEs comprising the first UE and the second UE, wherein determining that the control resources in the first portion of the slot are allocated for sending the sidelink request by the first UE is based at least in part on the comparing.

Aspect 10: The method of any of aspects 7 through 9, further comprising determining a rotating schedule for slot allocation, wherein determining that the control resources in the first portion of the slot are allocated for sending the sidelink request by the first UE is based at least in part on the rotating schedule.

Aspect 11: The method of any of aspects 7 through 10, further comprising determining a preconfigured slot allocation assignment, wherein determining that the control resources in the first portion of the slot are allocated for sending the sidelink request by the first UE is based at least in part on the preconfigured slot allocation assignment.

Aspect 12: A method for wireless communications at a second UE, comprising: determining shared resources for communicating over one or more sidelink communication links, the shared resources comprising control resources and data resources; monitoring, on a receive beam over control resources in a first portion of a slot, for a sidelink request to reserve a subset of the data resources from a first UE; receiving, based at least in part on the monitoring, the sidelink request from the first UE, the sidelink request indicating that the second UE is a target UE of the sidelink request; and determining, based at least in part on receiving the sidelink request, whether to transmit a sidelink response to the first UE on a transmission beam over control resources in a second portion of the slot, the sidelink response indicating a positive sidelink response to the sidelink request to reserve the subset of the data resources, or a negative sidelink response to the sidelink request to reserve the subset of the data resources.

Aspect 13: The method of aspect 12, further comprising transmitting, based at least in part on determining whether to transmit the sidelink response, the sidelink response to the first UE on the transmission beam over the control resources in the second portion of the slot.

Aspect 14: The method of aspect 13, further comprising: receiving, on a second receive beam over control resources in a first portion of a second slot, a second sidelink request to reserve the subset of the data resources from a third UE; and determining, based at least in part on receiving the second sidelink request on the second receive beam, a level of interference between a transmission from the third UE on the second receive beam and a transmission from the first UE on the receive beam.

Aspect 15: The method of aspect 14, further comprising transmitting, based at least in part on determining the level of interference between the transmission from the third UE on the second receive beam and the transmission from the first UE on the receive beam, the positive sidelink response to the first UE on the transmission beam over the control resources in the second portion of the slot.

Aspect 16: The method of any of aspects 14 through 15, further comprising transmitting, based at least in part on the level of interference between the transmission from the third UE on the second receive beam and the transmission from the first UE on the receive beam, a second negative sidelink response to the third UE on a second transmission beam over control resources in a second portion of the second slot.

Aspect 17: The method of any of aspects 12 through 16, further comprising: receiving, on the receive beam over control resources in a first portion of a second slot, a second sidelink request to reserve the subset of the data resources from a third UE; transmitting, to the third UE on the transmission beam over control resources in a second portion of the second slot, a second positive sidelink response; and receiving, based at least in part on the second positive sidelink response, a first sidelink confirmation indicating a reservation of the subset of the data resources on the receive beam over control resources in a third portion of the second slot, wherein monitoring for the sidelink request on the receive beam is based at least in part on receiving the first sidelink confirmation.

Aspect 18: The method of aspect 17, further comprising: determining, based at least in part on receiving the sidelink request and the second sidelink request, that the second UE is not available for a data transmission using the subset of the data resources from the first UE, wherein determining whether to transmit the sidelink response to the first UE one the transmission beam is based at least in part on determining that the second UE is not available for the data transmission; and refraining, based at least in part on determining that the second UE is not available for the data transmission using the subset of the data resources from the first UE, from transmitting the sidelink response to the first UE on the transmission beam over the control resources in the second portion of the slot.

Aspect 19: The method of aspect 18, further comprising: monitoring, on the receive beam over control resources in a third portion of the slot, for a second sidelink confirmation from the first UE; determining, based at least in part on monitoring for the second sidelink confirmation, that the first UE has not transmitted the second sidelink confirmation; and receiving, based at least in part on determining that the first UE has not transmitted the second sidelink confirmation, a data transmission from the third UE on the receive beam over the subset of the data resources.

Aspect 20: The method of any of aspects 12 through 19, further comprising: receiving a first sidelink confirmation indicating a reservation of the subset of the data resources transmitted from a third UE to a fourth UE on the transmission beam over control resources in a third portion of a second slot; determining, based at least in part on receiving the first sidelink confirmation, that the subset of the data resources is not available for a data transmission to the second UE using the transmission beam, wherein determining whether to transmit the sidelink response to the first UE is based at least in part on determining that the subset of the data resources is not available; and refraining, based at least in part on determining that the subset of the data resources is not available for the data transmission to the second UE using the transmission beam, from transmitting the sidelink response to the first UE.

Aspect 21: The method of any of aspects 12 through 20, further comprising: determining that the control resources in the first portion of the slot are allocated for sending the sidelink request by the first UE, wherein monitoring for the sidelink request over the control resources in the first portion of the slot is based at least in part on the determining that the control resources in the first portion of the slot are allocated for sending the sidelink request by the first UE.

Aspect 22: The method of aspect 21, further comprising: receiving, from a base station, a control resource allocation indicating that one or more slots in the control resources are allocated to a set of UEs for reserving the data resources, wherein the set of UEs comprises the first UE and the second UE, wherein determining that the control resources in the first portion of the slot are allocated for sending the sidelink request by the first UE is based at least in part on the control resource allocation.

Aspect 23: The method of any of aspects 21 through 22, further comprising comparing a UE identifier of the second UE to one or more UE identifiers of a set of UEs comprising the first UE and the second UE, wherein determining that the control resources in the first portion of the slot are allocated for sending the sidelink request by the first UE is based at least in part on the comparing.

Aspect 24: The method of any of aspects 21 through 23, further comprising determining a rotating schedule for slot allocation, wherein determining that the control resources in the first portion of the slot are allocated for sending the sidelink request by the first UE is based at least in part on the rotating schedule.

Aspect 25: The method of any of aspects 21 through 24, further comprising determining a preconfigured slot allocation assignment, wherein determining that the control resources in the first portion of the slot are allocated for sending the sidelink request by the first UE is based at least in part on the preconfigured slot allocation assignment.

Aspect 26: The method of any of aspects 12 through 25, wherein receiving the sidelink request indicating that the second UE is the target UE of the sidelink request comprises receiving a unique identifier indicating that the that the second UE is the target UE of the sidelink request.

Aspect 27: A method for wireless communications at a third UE, comprising: determining shared resources for communicating over one or more sidelink communication links, the shared resources comprising control resources and data resources; monitoring, on a receive beam over control resources in a first portion of a slot, for a sidelink request to reserve a subset of the data resources; receiving, based at least in part on the monitoring, the sidelink request from the first UE, the sidelink request indicating that a second UE is a target UE of the sidelink request; and determining, based at least in part on receiving the sidelink request, whether to transmit a sidelink response to the first UE on a transmission beam over control resources in a second portion of the slot, the sidelink response indicating a positive response to the sidelink request to reserve the subset of the data resources, or a negative response to the sidelink request to reserve the subset of the data resources.

Aspect 28: The method of aspect 27, further comprising: determining, based at least in part on receiving the sidelink request, that the third UE is not the target UE of the sidelink request, wherein determining whether to transmit the sidelink response to the first UE is based at least in part on determining that the third UE is not the target UE; and refraining, based at least in part on determining that the third UE is not the target UE, from transmitting the sidelink response to the first UE.

Aspect 29: The method of any of aspects 27 through 28, further comprising: receiving, on the receive beam over control resources in a first portion of a second slot, a second sidelink request to reserve the subset of the data resources; transmitting, to a fourth UE on the transmission beam over control resources in a second portion of the second slot, a second positive sidelink response; and receiving, based at least in part on the second positive sidelink response, a first sidelink confirmation indicating a reservation of the subset of the data resources on the transmission beam over control resources in a third portion of the second slot, wherein monitoring for the sidelink request on the receive beam is based at least in part on receiving the first sidelink confirmation.

Aspect 30: The method of aspect 29, further comprising: measuring, based at least in part on receiving the sidelink request on the receive beam, a level of interference associated with the first UE on the receive beam; and determining, based at least in part on the measuring, whether a data transmission by the first UE on the subset of the data resources satisfies an interference threshold, wherein determining whether to transmit the sidelink response to the first UE on the transmission beam is based at least in part on determining whether the data transmission by the first UE on the subset of the data resources satisfies the interference threshold.

Aspect 31: The method of aspect 30, further comprising refraining, based at least in part on the measuring, from transmitting the negative sidelink response to the first UE.

Aspect 32: The method of any of aspects 30 through 31, further comprising transmitting, based at least in part on the measuring, the negative sidelink response to the first UE.

Aspect 33: The method of any of aspects 27 through 32, further comprising determining that the control resources in the first portion of the slot are allocated for sending the sidelink request by the first UE, wherein monitoring for the sidelink request over the control resources in the first portion of the slot is based at least in part on the determining that the control resources in the first portion of the slot are allocated for sending the sidelink request by the first UE.

Aspect 34: The method of aspect 33, further comprising receiving, from a base station, a control resource allocation indicating that one or more slots in the control resources are allocated to a set of UEs for reserving the data resources, wherein the set of UEs comprises the first UE and the second UE, determining that the control resources in the first portion of the slot are allocated for sending the sidelink request by the first UE is based at least in part on the control resource allocation.

Aspect 35: The method of any of aspects 33 through 34, further comprising comparing a UE identifier of the third UE to one or more UE identifiers of a set of UEs comprising the first UE and the third UE, wherein determining that the control resources in the first portion of the slot are allocated for sending the sidelink request by the first UE is based at least in part on the comparing.

Aspect 36: The method of any of aspects 33 through 35, further comprising determining a rotating schedule for slot allocation, wherein determining that the control resources in the first portion of the slot are allocated for sending the sidelink request by the first UE is based at least in part on the rotating schedule.

Aspect 37: The method of any of aspects 33 through 36, further comprising determining a preconfigured slot allocation assignment, wherein determining that the control resources in the first portion of the slot are allocated for sending the sidelink request by the first UE is based at least in part on the preconfigured slot allocation assignment.

Aspect 38: An apparatus for wireless communications at a first UE, comprising a processor; memory coupled with the processor; and instructions stored in the memory and executable by the processor to cause the apparatus to perform a method of any of aspects 1 through 11.

Aspect 39: An apparatus for wireless communications at a first UE, comprising at least one means for performing a method of any of aspects 1 through 11.

Aspect 40: A non-transitory computer-readable medium storing code for wireless communications at a first UE, the code comprising instructions executable by a processor to perform a method of any of aspects 1 through 11.

Aspect 41: An apparatus for wireless communications at a second UE, comprising a processor; memory coupled with the processor; and instructions stored in the memory and executable by the processor to cause the apparatus to perform a method of any of aspects 12 through 26.

Aspect 42: An apparatus for wireless communications at a second UE, comprising at least one means for performing a method of any of aspects 12 through 26.

Aspect 43: A non-transitory computer-readable medium storing code for wireless communications at a second UE, the code comprising instructions executable by a processor to perform a method of any of aspects 12 through 26.

Aspect 44: An apparatus for wireless communications at a third UE, comprising a processor; memory coupled with the processor; and instructions stored in the memory and executable by the processor to cause the apparatus to perform a method of any of aspects 27 through 37.

Aspect 45: An apparatus for wireless communications at a third UE, comprising at least one means for performing a method of any of aspects 27 through 37.

Aspect 46: A non-transitory computer-readable medium storing code for wireless communications at a third UE, the code comprising instructions executable by a processor to perform a method of any of aspects 27 through 37.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first user equipment (UE), comprising:
   a processor, and
   memory coupled with the processor and storing instructions executable by the processor to cause the apparatus to:
      determine shared resources for communicating over one or more sidelink communication links, the shared resources comprising control resources and data resources, the control resources in a first portion of a slot being allocated for sending a sidelink request by the first UE;
      transmit, to a second UE on a transmission beam over the control resources in the first portion of the slot, the sidelink request to reserve a subset of the data resources;
      monitor, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both, the control resources in the second portion of the slot being allocated for the one or more sidelink responses; and
      determine, based at least in part on the monitoring, whether to transmit a sidelink confirmation indicating a reservation of the subset of the data resources to the second UE over control resources in a third portion of the slot, the control resources in the third portion of the slot being allocated for the sidelink confirmation.

2. The apparatus of claim 1, wherein the instructions are further executable by the processor to cause the apparatus to:
   receive, based at least in part on the monitoring, a positive sidelink response of the one or more sidelink responses from the second UE; and
   transmit, based at least in part on receiving the positive sidelink response from the second UE, the sidelink confirmation to the second UE over the control resources in the third portion of the slot.

3. The apparatus of claim 1, wherein the instructions are further executable by the processor to cause the apparatus to:
   receive, based at least in part on the monitoring, a positive sidelink response of the one or more sidelink responses from the second UE;
   receive, based at least in part on the monitoring, a negative sidelink response of the one or more sidelink responses from a third UE, wherein the positive sidelink response and the negative sidelink response are multiplexed in the control resources in the second portion of the slot; and
   refrain, based at least in part on receiving the positive sidelink response and the negative sidelink response, from transmitting the sidelink confirmation to the second UE over the control resources in the third portion of the slot.

4. The apparatus of claim 1, wherein the instructions are further executable by the processor to cause the apparatus to:
   determine, based at least in part on the monitoring, that none of the one or more sidelink responses have been received, wherein determining whether to transmit the sidelink confirmation comprises determining not to transmit the sidelink confirmation based at least in part on determining that none of the one or more sidelink responses have been received; and
   refrain from transmitting the sidelink confirmation to the second UE over the control resources in the third portion of the slot.

5. The apparatus of claim 1, wherein the instructions are further executable by the processor to cause the apparatus to perform a beam training procedure with UEs of a set of UEs comprising the second UE, wherein transmitting the sidelink request on the transmission beam is based at least in part on the beam training procedure.

6. The apparatus of claim 1, wherein the instructions are further executable by the processor to cause the apparatus to:

receive, from a network device, a control resource allocation indicating that one or more slots in the control resources are allocated to a set of UEs for reserving the data resources, wherein the set of UEs comprises the first UE and the second UE; and determine that the control resources in the first portion of the slot are allocated for sending the sidelink request by the first UE based at least in part on the control resource allocation.

7. The apparatus of claim 1, wherein the instructions are further executable by the processor to cause the apparatus to:

compare a UE identifier of the first UE to one or more UE identifiers of a set of UEs comprising the first UE and the second UE; and determine that the control resources in the first portion of the slot are allocated for sending the sidelink request by the first UE based at least in part on the comparing.

8. The apparatus of claim 1, wherein the instructions are further executable by the processor to cause the apparatus to:

determine a rotating schedule for slot allocation; and determine that the control resources in the first portion of the slot are allocated for sending the sidelink request by the first UE based at least in part on the rotating schedule.

9. The apparatus of claim 1, wherein the instructions are further executable by the processor to cause the apparatus to:

determine a preconfigured slot allocation assignment; and determine that the control resources in the first portion of the slot are allocated for sending the sidelink request by the first UE based at least in part on the preconfigured slot allocation assignment.

10. A method for wireless communications at a first user equipment (UE), comprising:

determining shared resources for communicating over one or more sidelink communication links, the shared resources comprising control resources and data resources, the control resources in a first portion of a slot being allocated for sending a sidelink request by the first UE;

transmitting, to a second UE on a transmission beam over the control resources in the first portion of the slot, the sidelink request to reserve a subset of the data resources;

monitoring, by the first UE on a receive beam over control resources in a second portion of the slot, for one or more sidelink responses from one or more UEs, the one or more sidelink responses indicating a positive sidelink response to the sidelink request to reserve the subset of the data resources, a negative sidelink response to the sidelink request to reserve the subset of the data resources, or both, the control resources in the second portion of the slot being allocated for the one or more sidelink responses; and determining, based at least in part on the monitoring, whether to transmit a sidelink confirmation indicating a reservation of the subset of the data resources to the second UE over control resources in a third portion of the slot, the control resources in the third portion of the slot being allocated for the sidelink confirmation.

11. The method of claim 10, further comprising:

receiving, based at least in part on the monitoring, a positive sidelink response of the one or more sidelink responses from the second UE; and transmitting, based at least in part on receiving the positive sidelink response from the second UE, the sidelink confirmation to the second UE over the control resources in the third portion of the slot.

\* \* \* \* \*